(12) United States Patent
Van Weelden et al.

(10) Patent No.: US 11,821,342 B2
(45) Date of Patent: Nov. 21, 2023

(54) SYSTEMS AND METHODS FOR CONTROLLED RELATIVE ROTATIONAL MOTION

(71) Applicant: HUSCO Automotive Holdings LLC, Waukesha, WI (US)

(72) Inventors: Curtis L. Van Weelden, Waukesha, WI (US); Dean Wardle, Oconomowoc, WI (US); Selena Boltik, Wauwatosa, WI (US); Austin Schmitt, Hartland, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 17/608,442

(22) PCT Filed: May 4, 2020

(86) PCT No.: PCT/US2020/031346
§ 371 (c)(1),
(2) Date: Nov. 2, 2021

(87) PCT Pub. No.: WO2020/227229
PCT Pub. Date: Nov. 12, 2020

(65) Prior Publication Data
US 2022/0195898 A1     Jun. 23, 2022

Related U.S. Application Data

(60) Provisional application No. 62/842,940, filed on May 3, 2019.

(51) Int. Cl.
*F01L 1/352* (2006.01)
*F01L 1/46* (2006.01)
*F01L 13/00* (2006.01)

(52) U.S. Cl.
CPC .................. *F01L 1/352* (2013.01); *F01L 1/46* (2013.01); *F01L 2013/103* (2013.01); *F01L 2820/032* (2013.01)

(58) Field of Classification Search
CPC ....... F01L 1/352; F01L 1/46; F01L 2013/103; F01L 2820/032
(Continued)

(56) References Cited

U.S. PATENT DOCUMENTS 4,988,329 A    1/1991   Lammers
7,118,510 B2   10/2006   Raghavan et al.
(Continued)

FOREIGN PATENT DOCUMENTS

CN        103238009 A    8/2013
DE    102012013660 A1   1/2014
(Continued)

OTHER PUBLICATIONS

PCT International Search Report and Written Opinion, PCT/US2020/031346, dated Aug. 26, 2020, 11 pages.
(Continued)

*Primary Examiner* — Jorge L Leon, Jr.
(74) *Attorney, Agent, or Firm* — Quarles & Brady LLP

(57) ABSTRACT

A cam phasing system is provided. In some non-limiting examples, the cam phasing system includes a planetary actuator having a first sun gear, a first set of planet gears meshed to and arranged circumferentially around the first sun gear, a first ring gear meshed with the first set of planet gears, and a second sun gear. The second sun gear is rotationally fixed. The planetary actuator further includes a second set of planet gears meshed to and arranged circumferentially around the second sun gear, a second ring gear meshed with the second set of planet gears, and an input shaft rotationally coupled to the first sun gear for rotation (Continued)

therewith. Rotation of the input shaft rotates the first ring gear relative to the second ring gear.

21 Claims, 29 Drawing Sheets

(58) Field of Classification Search
USPC .................................................. 123/90.15
See application file for complete search history.

(56) References Cited

U.S. PATENT DOCUMENTS

| | | | |
|---|---|---|---|
| 7,198,586 B2 | 4/2007 | Brooks et al. | |
| 8,162,793 B2 | 4/2012 | Diosi et al. | |
| 8,360,923 B2 | 1/2013 | Kraynev et al. | |
| 2007/0056541 A1* | 3/2007 | Meintschel | F16H 35/008 |
| | | | 123/90.17 |
| 2007/0056542 A1* | 3/2007 | Gregor | F16H 35/008 |
| | | | 123/90.17 |
| 2007/0266975 A1* | 11/2007 | Meintschel | F01L 1/34 |
| | | | 123/90.17 |
| 2008/0173281 A1 | 7/2008 | Jurging et al. | |
| 2010/0064997 A1* | 3/2010 | Ai | F01L 1/352 |
| | | | 464/2 |
| 2010/0064998 A1* | 3/2010 | Hale | F01L 1/352 |
| | | | 123/90.17 |
| 2017/0022855 A1* | 1/2017 | Schmitt | F01L 1/34409 |
| 2017/0059003 A1 | 3/2017 | Wagh et al. | |

FOREIGN PATENT DOCUMENTS

| | | | |
|---|---|---|---|
| DE | 112015003581 T5 | 6/2017 | |
| JP | 2019027435 A | 2/2019 | |
| WO | WO-2010068613 A1 * | 6/2010 | ............. F01L 1/352 |
| WO | WO-2012034791 A1 * | 3/2012 | ............. F01L 1/352 |

OTHER PUBLICATIONS

European Patent Office, Extended Search Report, Application No. 20802608.8, dated Feb. 28, 2023, 9 pages.

* cited by examiner

SYSTEMS AND METHODS FOR CONTROLLED RELATIVE ROTATIONAL MOTION

CROSS-REFERENCES TO RELATED APPLICATIONS

The present application represents the U.S. national stage entry of International Application No. PCT/US2020/031346 filed May 4, 2020, which is based on and claims priority to U.S. Provisional Patent Application No. 62/842,940, filed on May 3, 2019. The entire disclosure of which is incorporated herein by reference in its entirety.

STATEMENT REGARDING FEDERALLY SPONSORED RESEARCH

Not Applicable.

BACKGROUND

In general, rotary systems (e.g., engines, motors, etc.) may include a drive member and a driven member that is rotationally driven by the drive member.

BRIEF SUMMARY

In one aspect, the present disclosure provides a planetary actuator including a first sun gear, a first set of planet gears meshed to and arranged circumferentially around the first sun gear, a first ring gear meshed with the first set of planet gears, and a second sun gear. The second sun gear is rotationally fixed. The planetary actuator further includes a second set of planet gears meshed to and arranged circumferentially around the second sun gear, a second ring gear meshed with the second set of planet gears, and an input shaft rotationally coupled to the first sun gear for rotation therewith. Rotation of the input shaft rotates the first ring gear relative to the second ring gear.

In one aspect, the present disclosure provides a cam phasing system for varying a rotational relationship between a crank shaft and a cam shaft. The cam phasing system includes a sprocket hub, a cradle rotor, and a planetary actuator. The planetary actuator includes a first sun gear, a first set of planet gears meshed to and arranged circumferentially around the first sun gear, and a first ring gear meshed with the first set of planet gears. The first ring gear is coupled to the cradle rotor. The planetary actuator further includes a second sun gear, a second set of planet gears meshed to and arranged circumferentially around the second sun gear, and a second ring gear meshed with the second set of planet gears. The second sun gear is rotationally fixed. The second ring gear is rotationally fixed to the sprocket hub for rotation therewith. The planetary actuator further includes an input shaft rotationally coupled to the first sun gear for rotation therewith. Rotation of the input shaft rotates the cradle rotor relative to the sprocket hub.

In one aspect, the present disclosure provides a planetary actuator including a first sun gear, a first set of planet gears meshed to and arranged circumferentially around the first sun gear, a first ring gear meshed with the first set of planet gears, and a second sun gear. The second sun gear is rotationally fixed. The planetary actuator further includes a second set of planet gears meshed to and arranged circumferentially around the second sun gear, a second ring gear meshed with the second set of planet gears, and an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. The input shaft is rotationally stationary in the steady-state mode.

In one aspect, the present disclosure provides a planetary actuator including a first sun gear, a first set of planet gears meshed to and arranged circumferentially around the first sun gear, a first ring gear meshed with the first set of planet gears, and a second sun gear. The second sun gear is rotationally fixed. The planetary actuator further includes a second set of planet gears meshed to and arranged circumferentially around the second sun gear, a second ring gear meshed with the second set of planet gears, and an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. The rotation of the input shaft in the phasing mode is less than a rotational speed of the second ring gear.

In one aspect, the present disclosure provides a planetary actuator including a first sun gear, a first set of planet gears meshed to and arranged circumferentially around the first sun gear, a first ring gear meshed with the first set of planet gears, and a second sun gear. The second sun gear is rotationally fixed. The planetary actuator further includes a second set of planet gears meshed to and arranged circumferentially around the second sun gear, a second ring gear meshed with the second set of planet gears, and an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. A gear reduction exists from the input shaft to the second ring gear to reduce a torque required to achieve the relative rotation between the first ring gear and the second ring gear.

In one aspect, the present disclosure provides a cam phasing system for varying a rotational relationship between a crank shaft and a cam shaft. The cam phasing system includes a sprocket hub, a cradle rotor, and a planetary actuator. The planetary actuator includes a first sun gear, a first set of planet gears meshed to and arranged circumferentially around the first sun gear, and a first ring gear meshed with the first set of planet gears. The first ring gear is coupled to the cradle rotor. The planetary actuator further includes a second sun gear, a second set of planet gears meshed to and arranged circumferentially around the second sun gear, and a second ring gear meshed with the second set of planet gears. The second sun gear is rotationally fixed. The second ring gear is rotationally fixed to the sprocket hub for rotation therewith. The planetary actuator further includes an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. The input shaft is rotationally stationary in the steady-state mode.

In one aspect, the present disclosure provides a cam phasing system for varying a rotational relationship between a crank shaft and a cam shaft. The cam phasing system includes a sprocket hub, a cradle rotor, and a planetary actuator. The planetary actuator includes a first sun gear, a first set of planet gears meshed to and arranged circumferentially around the first sun gear, and a first ring gear meshed with the first set of planet gears. The first ring gear is coupled to the cradle rotor. The planetary actuator further includes a second sun gear, a second set of planet gears meshed to and arranged circumferentially around the second sun gear, and a second ring gear meshed with the second set of planet gears. The second sun gear is rotationally fixed. The second ring gear is rotationally fixed to the sprocket hub for rotation therewith. The planetary actuator further includes an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. The rotation of the input shaft in the phasing mode is less than a rotational speed of the second ring gear.

In one aspect, the present disclosure provides a cam phasing system for varying a rotational relationship between a crank shaft and a cam shaft. The cam phasing system includes a sprocket hub, a cradle rotor, and a planetary actuator. The planetary actuator includes a first sun gear, a first set of planet gears meshed to and arranged circumferentially around the first sun gear, and a first ring gear meshed with the first set of planet gears. The first ring gear is coupled to the cradle rotor. The planetary actuator further includes a second sun gear, a second set of planet gears meshed to and arranged circumferentially around the second sun gear, and a second ring gear meshed with the second set of planet gears. The second sun gear is rotationally fixed. The second ring gear is rotationally fixed to the sprocket hub for rotation therewith. The planetary actuator further includes an input shaft rotationally coupled to the first sun gear for rotation therewith and operable in a steady-state mode where relative rotation between the first ring gear and the second ring gear is inhibited and a phasing mode where a rotation of the input shaft a predetermined magnitude rotates the first ring gear relative to the second ring gear in a desired direction. A gear reduction exists from the input shaft to the second ring gear to reduce a torque required to achieve the relative rotation between the first ring gear and the second ring gear.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
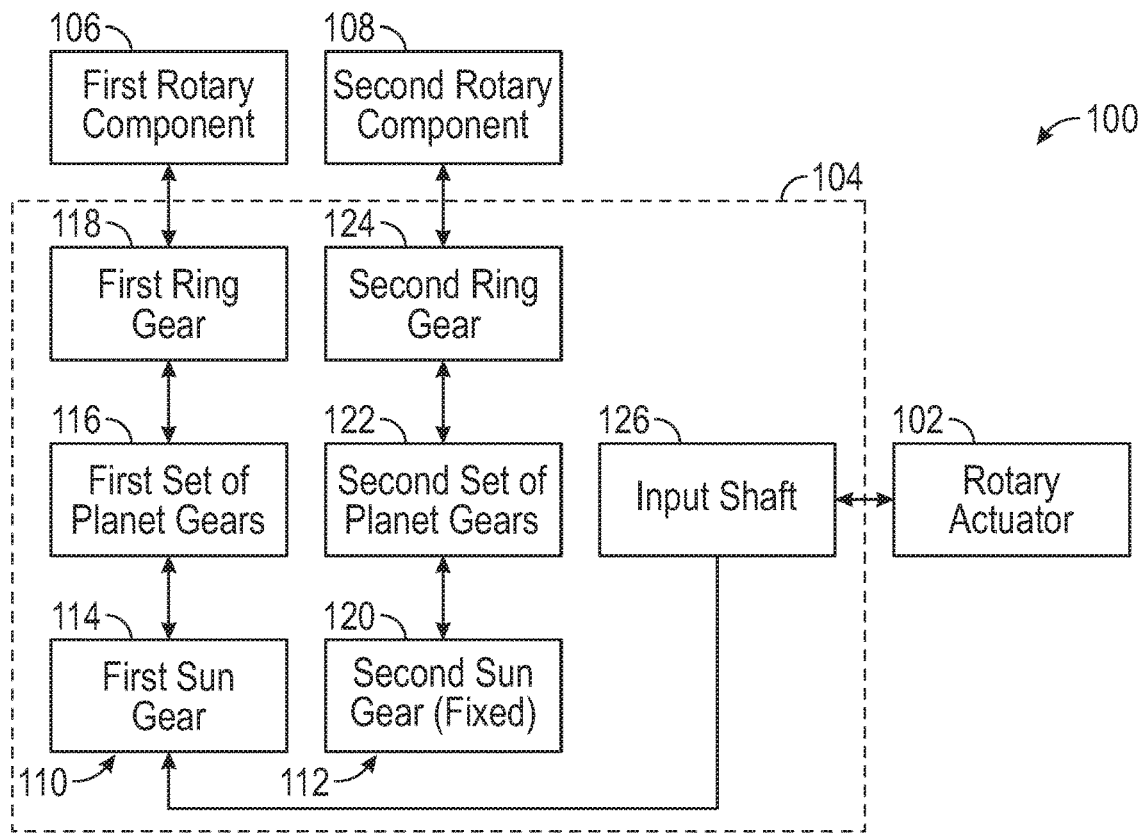
FIG. 1 is a schematic illustration of a rotational phasing system according to one aspect of the present disclosure.

The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, a central axis or an elongate direction of a particular component or system.

Conventional rotational phasing (i.e., selective relative rotation or rotational offset) systems require an input mechanism to apply a force, or displacement, to achieve a desired relative rotation between two components. In some systems, an axial/linear input is provided by an actuator. The amount of force required to facilitate the desired phasing exponentially increases the cost of conventional phasing systems. In addition, the amount of relative rotation provided by the phasing system increases a height of the phasing system. That is, as the amount of relative rotation needed in a given application increases, the actuator providing the axial/linear input is required to increase in stroke, which increases a height of the actuator and the overall packaging size of the phasing system.

Generally, the present disclosure provides systems and methods for selective controlled relative rotation in rotary systems. In some non-limiting examples, a planetary actuator may be configured to be coupled between two rotary components. For example, a first rotary component may be driven by an external source at a desired rotational speed, and a second rotary component may be rotationally driven by the second component. The planetary actuator may be rotationally driven by the first component and coupled between the first rotary component and the second rotary component to allow selective relative rotation between the first component and the second component. For example, the planetary actuator may be configured to rotationally displace/force the second component to provide a predetermined relative rotation (i.e., a predetermined rotational offset) in a desired direction between the first component and the second component.

The use of a planetary actuator according to the present disclosure may reduce an axial height of a phasing system, due to the use of a rotary displacement/force, rather than an axial/linear displacement/force to facilitate the relative rotational motion. In addition, the amount of force required to achieve the relative rotational motion may be substantially reduced when compared to conventional phasing systems, which reduces a cost of a phasing system utilizing the planetary actuator.

FIG. 1 schematically illustrates one non-limiting example of a rotational phasing system 100 according to the present disclosure. In the illustrated non-limiting example, the rotational phasing system 100 may include a rotary actuator 102, a planetary actuator 104, a first rotary component 106, and a second rotary component 108. In some non-limiting examples, the rotary actuator 102 may be a configured to selectively output a predetermined amount of rotary force/displacement in a desired direction. For example, the rotary actuator 102 may include a stator that is electromagnetically coupled to a rotor, where selectively energization of the stator electromagnetically rotates the rotor in a desired direction.

The planetary actuator 104 may be coupled between the rotary actuator 102 and both of the first rotary component 106 and the second rotary component 108. In the illustrated non-limiting example, the planetary actuator 104 include a first planetary gear set 110 and a second planetary gear set 112. The first planetary gear set 110 may include a first sun gear 114, a first set of planet gears 116, and a first ring gear 118. Similarly, the second planetary gear set 112 may include a second sun gear 120, a second set of planet gears 122, and a second ring gear 124.

Figure 2:
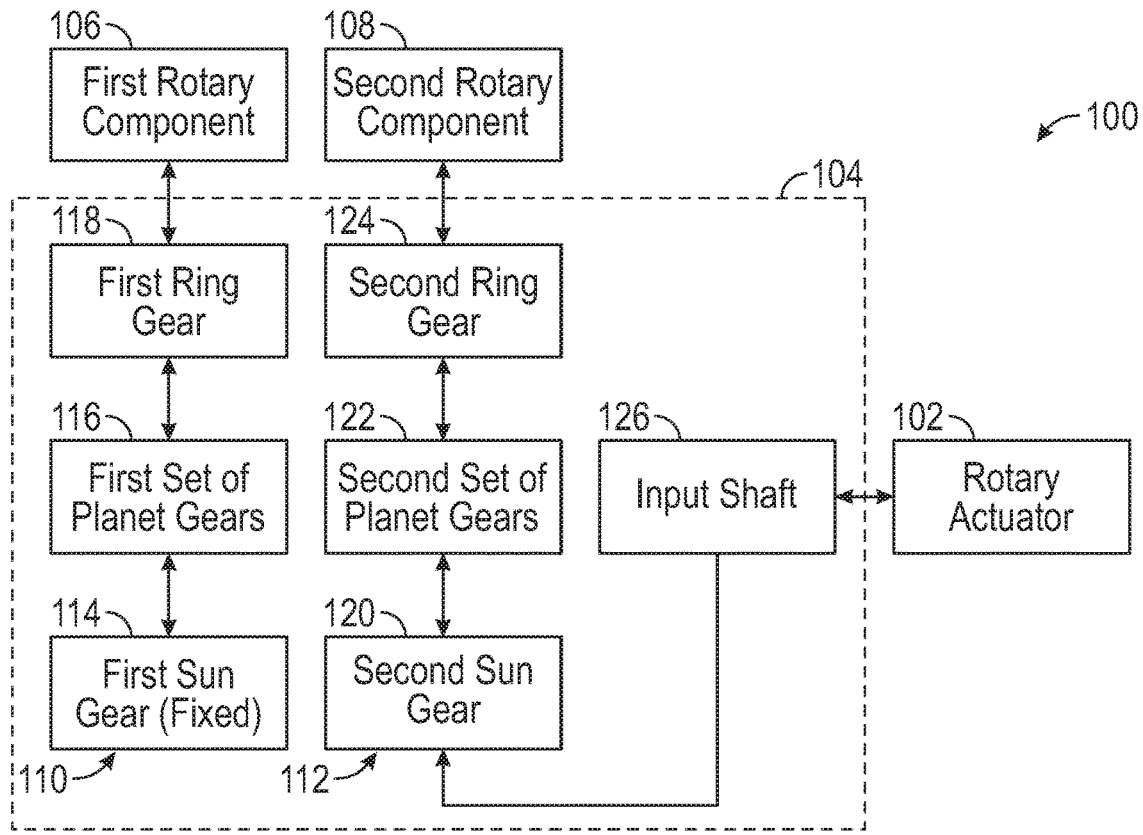
FIG. 2 is a schematic illustration of a rotational phasing system according to one aspect of the present disclosure.

In general, one of the first sun gear 114 and the second sun gear 120 may be rotationally fixed (i.e., prevented from rotating). The sun gear that is not fixed may be coupled to an input shaft 126. In the illustrated non-limiting example, the first sun gear 114 may be rotationally coupled to an input shaft 126 for rotation therewith, and the second sun gear 120 may be rotationally fixed. In other non-limiting examples, the first sun gear 114 may be rotationally fixed, and the second sun gear 120 may be rotationally coupled to the input shaft 126 for rotation therewith (see, e.g., FIG. 2). In some non-limiting examples, the input shaft 126 may be formed integrally with (i.e., as a unitary component) the sun gear rotationally coupled thereto. In some non-limiting examples, the input shaft 126 and the sun gear rotationally coupled thereto may be discrete, or separate components that are rotationally coupled to one another.

The first ring gear 118 may be coupled to the first rotary component 106, and the second ring gear 124 may be coupled to the second rotary component 108. In general, the first rotary component 106 may be driven rotationally by an external source (e.g., an internal combustion engine, an electric motor, or another reciprocally rotating machine) at a desired speed in a desired direction. The second rotary component 108 may be rotationally driven by the first rotary component 106, either directly or indirectly, at a desired speed, which may be different or the same as the rotational speed of the first rotary component 106. For example, the first set of planet gears 116 and the second set of planet gears 122 may be coupled to a common carrier. In this way, for example, the rotation of the first rotary component 106 may rotationally drive the first ring gear 118, which rotates the first set of planet gears 116. The first set of planet gears 116 may drive the common carrier, which rotationally drives the second set of planet gears 122. The second set of planet gears 122 may rotationally drive the second ring gear 124.

The rotary actuator 102 may be rotationally coupled to the input shaft 126 for rotation therewith. Thus, the selective rotational output provided by the rotary actuator 102 may be translated through the input shaft 126 to the first sun gear 114. The rotation of the first sun gear 114 by the rotary actuator 102 through the input shaft 126 may be translated to the first rotary component 106, either directly or indirectly, through the first set of planet gears 116 and the first ring gear 118. The magnitude of the rotation provided to the first rotary component 106 may be dependent on the gear ratios from the input shaft 126 to the first ring gear 118. In any case, these gear ratios may be known so the rotary actuator 102 may be configured to selectively rotate the first rotary component 106 relative to the second rotary component 108 a predetermined magnitude in a desired direction. In this way, for example, the planetary actuator 104 may be configured to transfer a rotational torque/displacement from the rotary actuator 102 to the first rotary component 106 to allow the first rotary component 106 to rotate a predetermined magnitude in a desired direction relative to the second rotary component 108.

In general, the design and implementation of the planetary actuator 104 only require an input signal (i.e., the input torque/displacement provided from the rotary actuator 102 to the first sun gear 114) to rotate when relative rotation is desired, rather than requiring the input signal to be constantly rotating with either the first rotary component 106 and/or the second rotary component 108. During steady-state operation, when no relative rotation is desired, the input signal may be rotationally fixed (e.g., stationary). During a change in phase (i.e., relative rotation), the rotary actuator 102 is not required to rotate at the same speed as either the first component 106 or the second component 108. For example, the rotary actuator 102, and thereby the first sun gear 114, may only be required to rotate at the rate of change of the relative angle desired. In this way, for example, a power and speed required by the rotary actuator 102 to achieve the desired relative rotation may be independent of a speed of the first rotary component 106 and/or the second rotary component 108. In addition, in the non-limiting examples, where a gear reduction exists between the input shaft 126 and the second rotary component 108, the gear reduction may reduce an amount of torque required to achieve the desired relative rotation.

In some non-limiting examples, the planetary actuator 104 may be utilized in a cam phasing system on an internal combustion engine to facilitate selective rotational phasing (i.e., a predetermined amount of relative rotation) between a cam shaft and a crank shaft. In some applications, the planetary actuator 104 may be utilized to directly drive the phasing between the cam shaft and the crank shaft. For example, the first rotary component 106 may be rotationally coupled to the cam shaft for rotation therewith and the second rotary component 108 may be rotationally coupled to the crank shaft for rotation therewith. The selective rotational output from the rotary actuator 102 may translate through the planetary actuator 104 to a desired magnitude of relative rotation, or offset, between the cam shaft and the crank shaft. In some applications, the planetary actuator 104 may be utilized in an electronic cam phasing system (e-phasing system), where the second rotary component 108 rotates with the cam shaft at the same rotational speed and the relative rotation provided to the first rotary component 106 directly varies a rotational relationship between the cam shaft and the crank shaft.

In some applications, the planetary actuator 104 may be utilized in a mechanical cam phasing system, where a two-way clutching, or locking mechanism, is coupled between the cam shaft and the crank shaft to selectively allow relative rotation therebetween. In these applications, the planetary actuator 104 may be configured to provide a predetermined amount of rotational force/displacement to the two-way clutch, or locking mechanism, which is determined by the rotational output provided thereto by the rotary actuator 102, to facilitate selective relative rotation between the cam shaft and the crank shaft in a desired direction.

In some applications, the planetary actuator 104 may be utilized in an electric motor to selectively vary a rotor alignment a predetermined magnitude as the rotor rotates.

Figure 3:
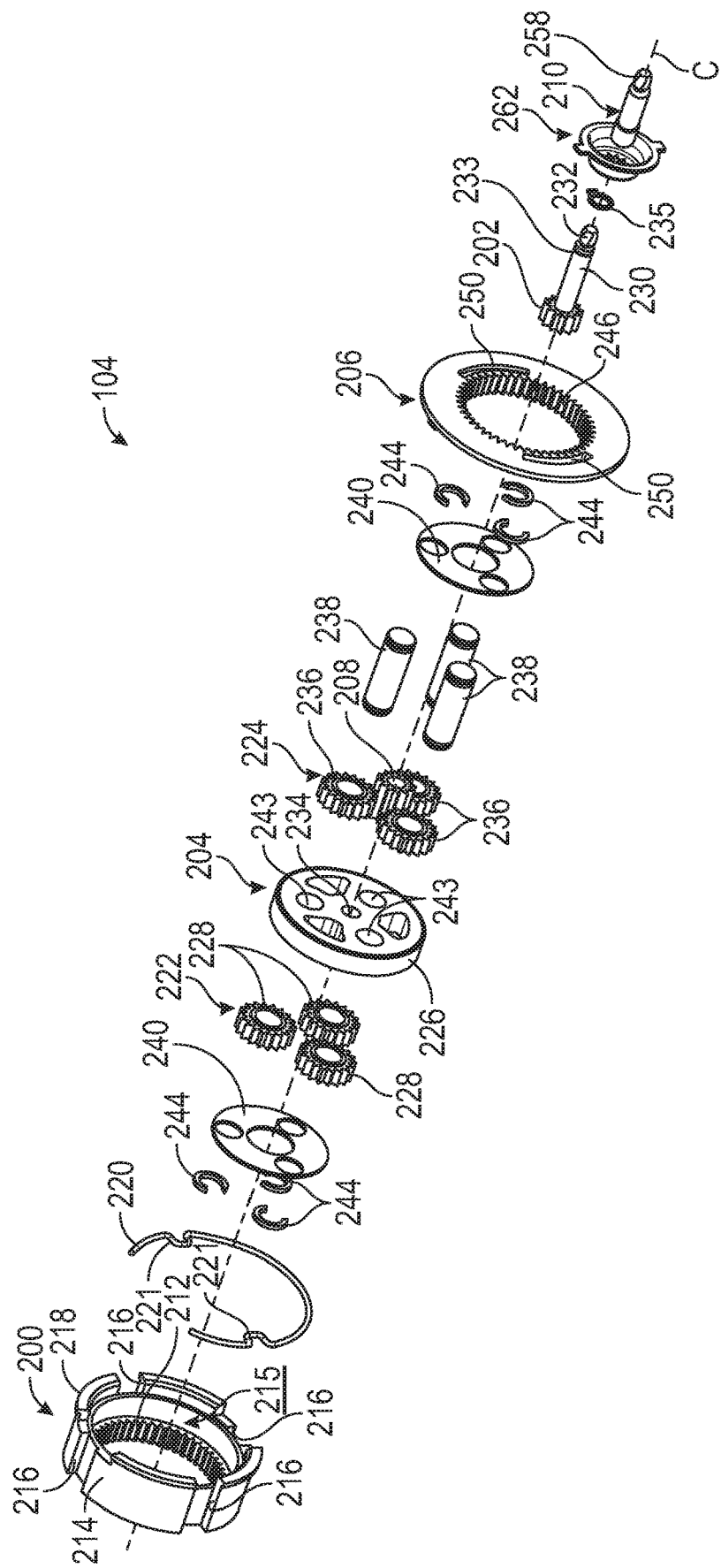
FIG. 3 is an exploded back, top, left isometric view of a planetary actuator according to one aspect of the present disclosure.

FIG. 3 illustrates one non-limiting example of the planetary actuator 104 according to the present disclosure. In the illustrated non-limiting example, the planetary actuator 104 may include a first ring gear 200, a first sun gear 202, a carrier assembly 204, a second ring gear 206, a second sun gear 208, and an input shaft 210. In the illustrated non-limiting example, the components of the planetary actuator 104 may be arranged along a common central axis C.

Figure 4:
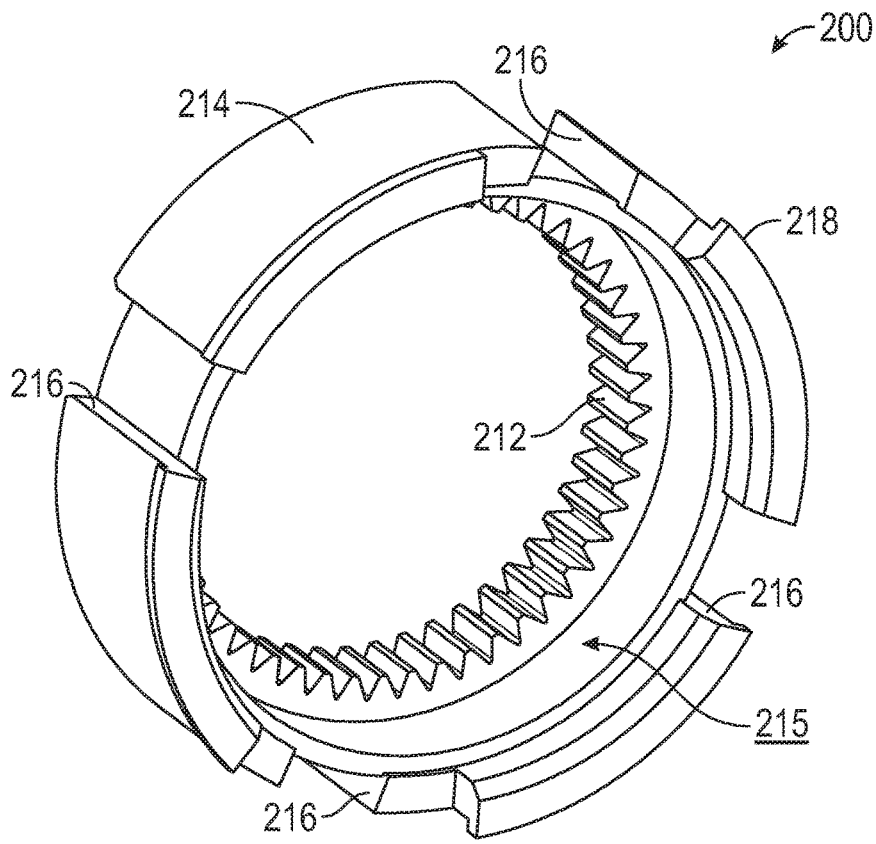
FIG. 4 is a back, top, left isometric view of a first ring gear of the planetary actuator of FIG. 3.
Figure 5:
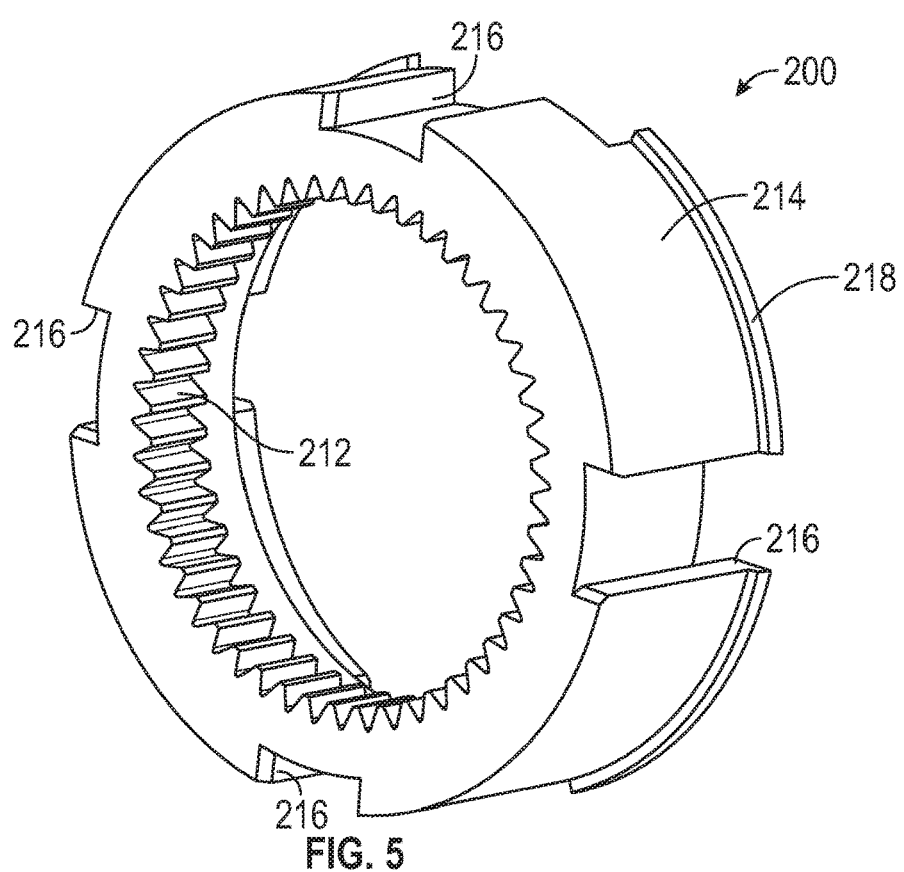
FIG. 5 is a front, top, left isometric view of the first ring gear of FIG. 4.
Figure 6:
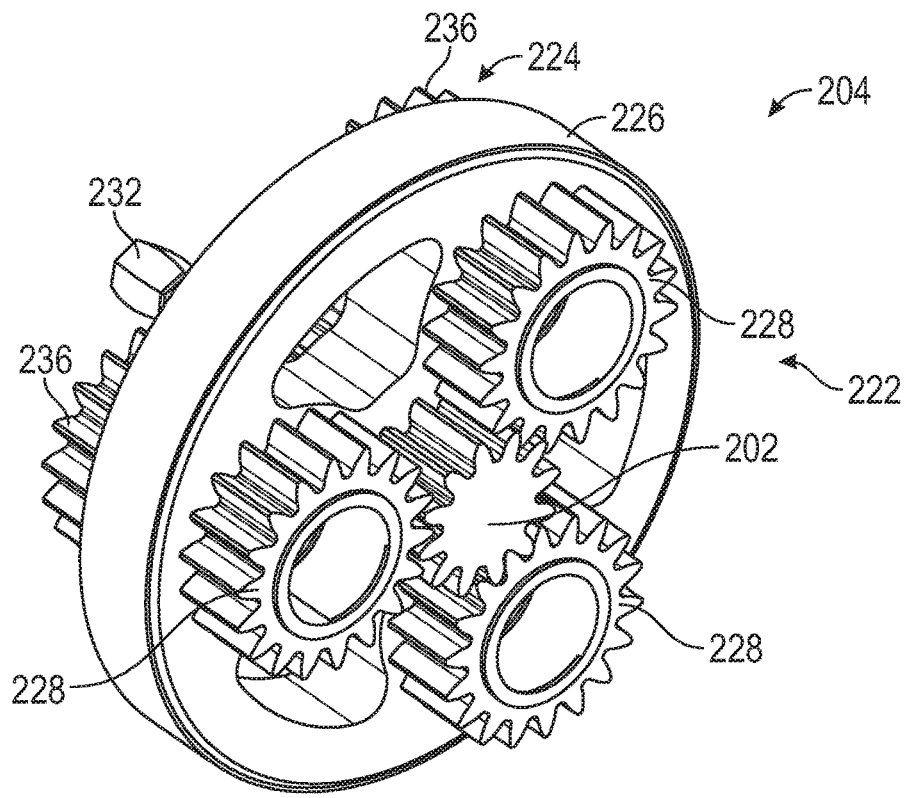
FIG. 6 is a front, top, right isometric view of a partially assembled carrier assembly of the planetary actuator of FIG. 3.
Figure 7:
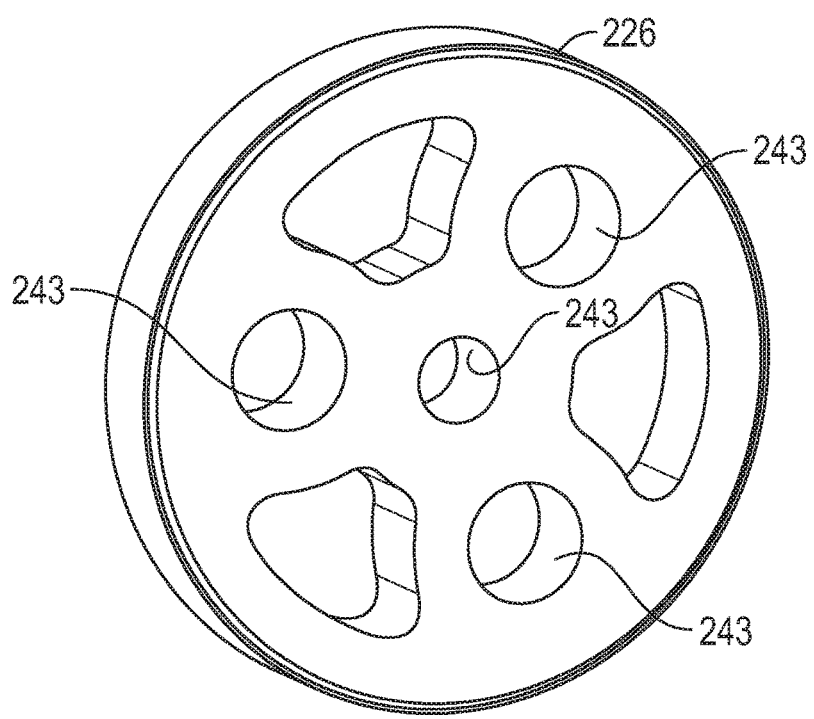
FIG. 7 is a back, top, left isometric view of a carrier plate of the carrier assembly of FIG. 6.

With reference to FIGS. 3-5, the first ring gear 200 may include an inner, geared surface 212 and an outer surface 214. The geared surface 212 may extend radially inward from an axial end of the first ring gear 200 and may include a plurality of gear teeth extending circumferentially around the geared surface 212. The outer surface 214 of the first ring gear 200 extends axially from a radially outer edge of the first ring gear 200 to form a cavity 215 within the first ring gear 200. The outer surface 214 may include a plurality of recessed slots 216 and a lip 218. The plurality of recessed slots 216 are recessed radially inwardly and extend axially along the length of the outer surface 214. In the illustrated non-limiting example, the first ring gear 200 includes four recessed slots 216 equally spaced circumferentially around the outer surface 214. In other non-limiting examples, the first ring gear 200 may include more or less than four recessed slots 216 arranged in any increments circumferentially around the outer surface 214.

In the illustrated non-limiting example, the lip 218 extends radially outwardly from an axial end of the first ring gear 200. The axial end from which the lip 218 extends may be arranged on an axially-opposing side of the first ring gear 200 compared to the geared surface 212. When the planetary actuator 104 is assembled, a snap ring 220 may be installed onto the outer surface 214 against the lip 218. The snap ring 220 may include protrusions 221 that extend radially inward and are each received within a corresponding one of the recessed slots 216 to maintain an axial position of the first ring gear 200 in an assembly.

With reference to FIGS. 6-9, the carrier assembly 204 may include a first set of planet gears 222, a second set of planet gears 224, and a carrier plate 226. The first set of planet gears 222 and the second set of planet gears 224 may be arranged on axially opposing sides of the carrier plate 226. In the illustrated non-limiting example, the first set of planet gears 222 may include three planet gears 228 arranged circumferentially around and meshed with the first sun gear 202. In other non-limiting examples, the first set of planet gears 222 may include more or less than three planet gears 228 arranged circumferentially around and meshed with the first sun gear 202.

Figure 8:
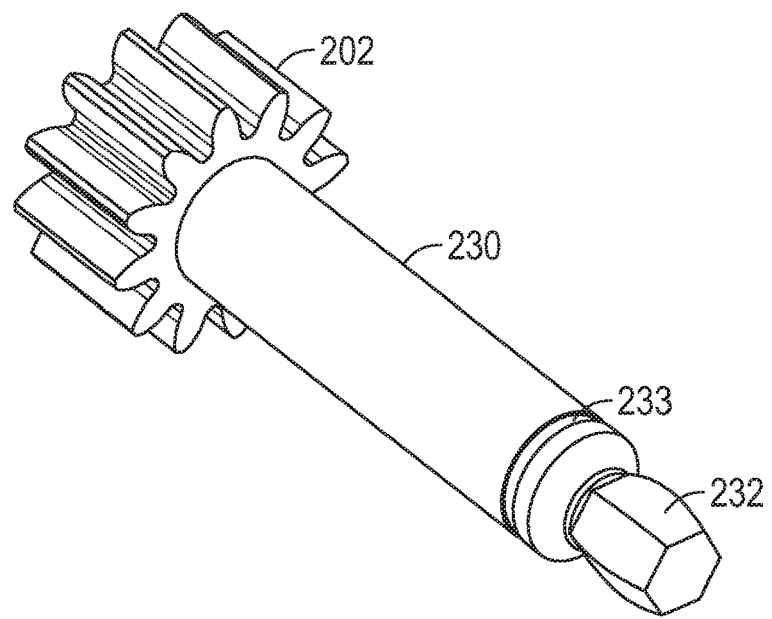
FIG. 8 is a back, top, left, isometric view of a first sun gear of the planetary actuator of FIG. 3.
Figure 9:
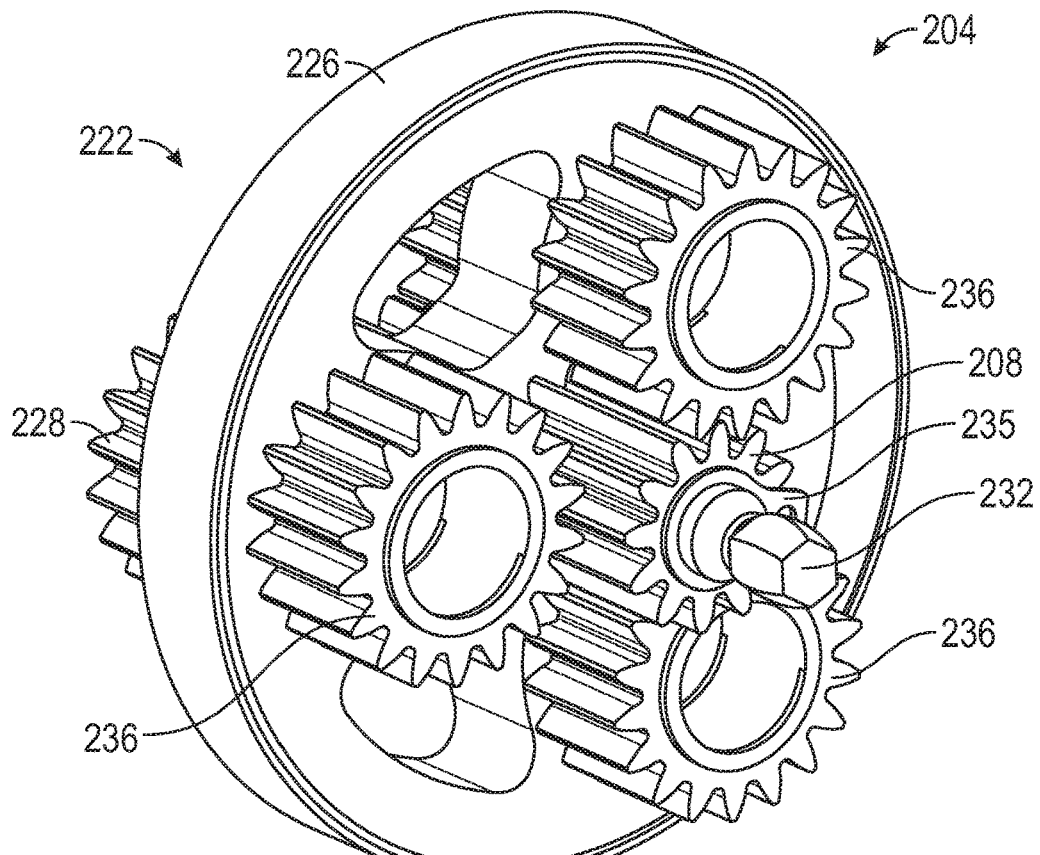
FIG. 9 is a back, top, left isometric view of the partially assembled carrier assembly of FIG. 6.
Figure 10:
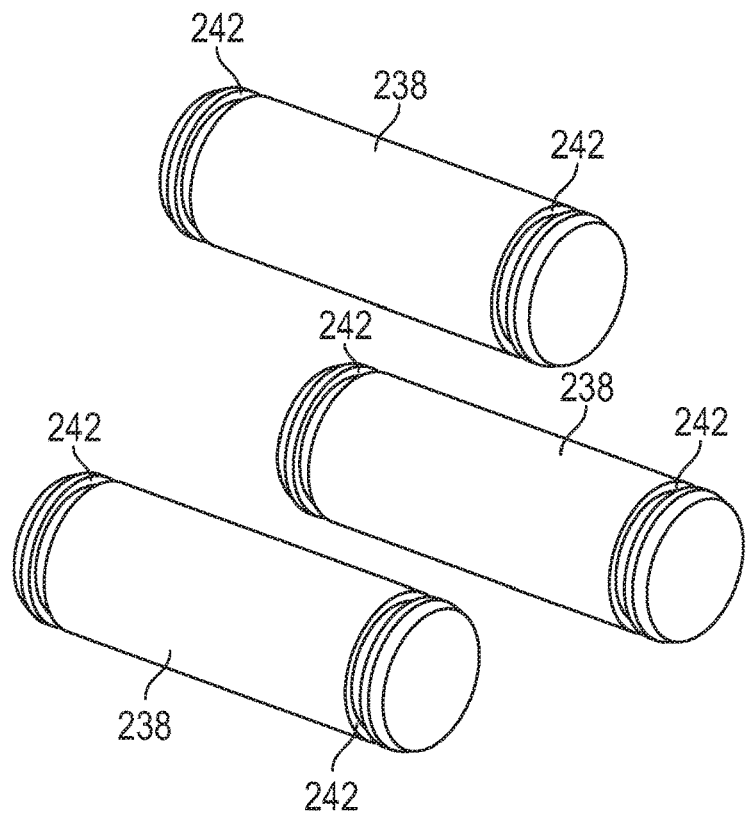
FIG. 10 is a back, top, left isometric view of bearing rods of the planetary actuator of FIG. 3.
Figure 11:
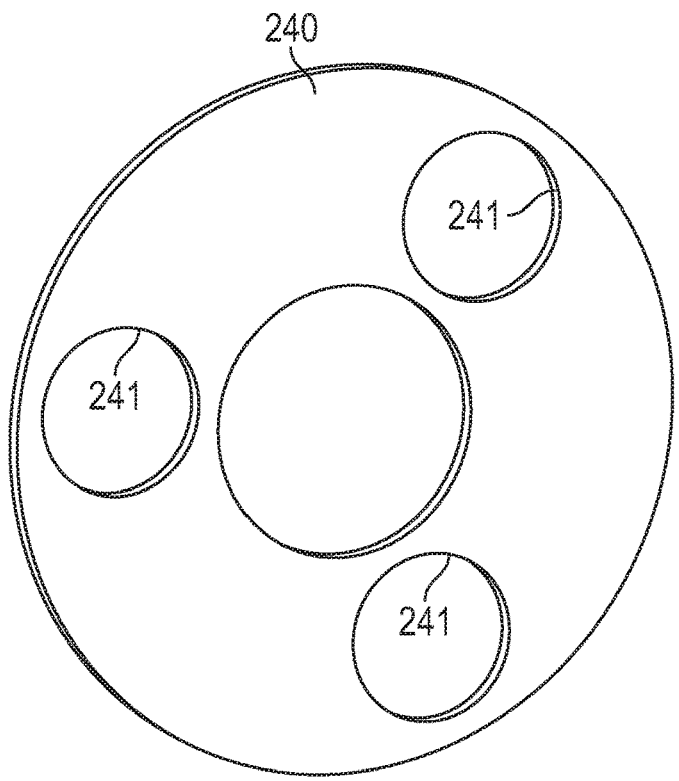
FIG. 11 is a back, top, left isometric view of a ring plate of the planetary actuator of FIG. 3.
Figure 12:
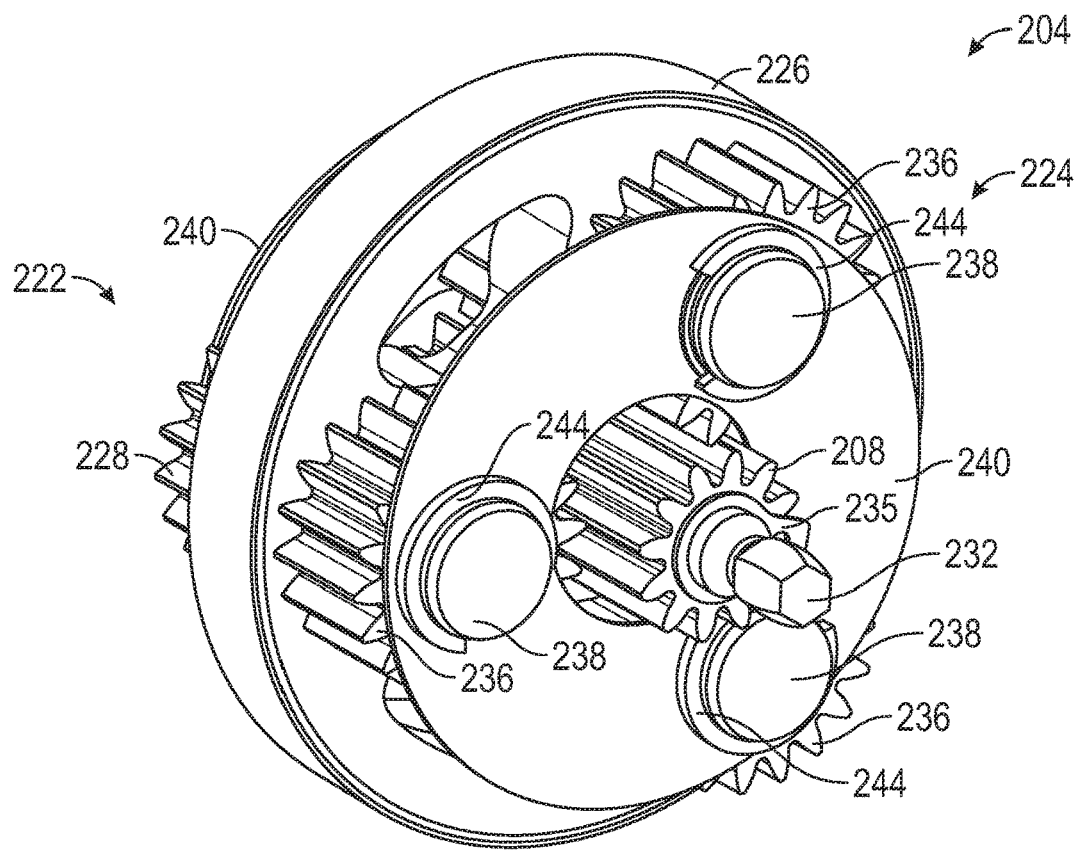
FIG. 12 is a back, top, left isometric view of an assembled carrier assembly of the planetary actuator of FIG. 3.
Figure 13:
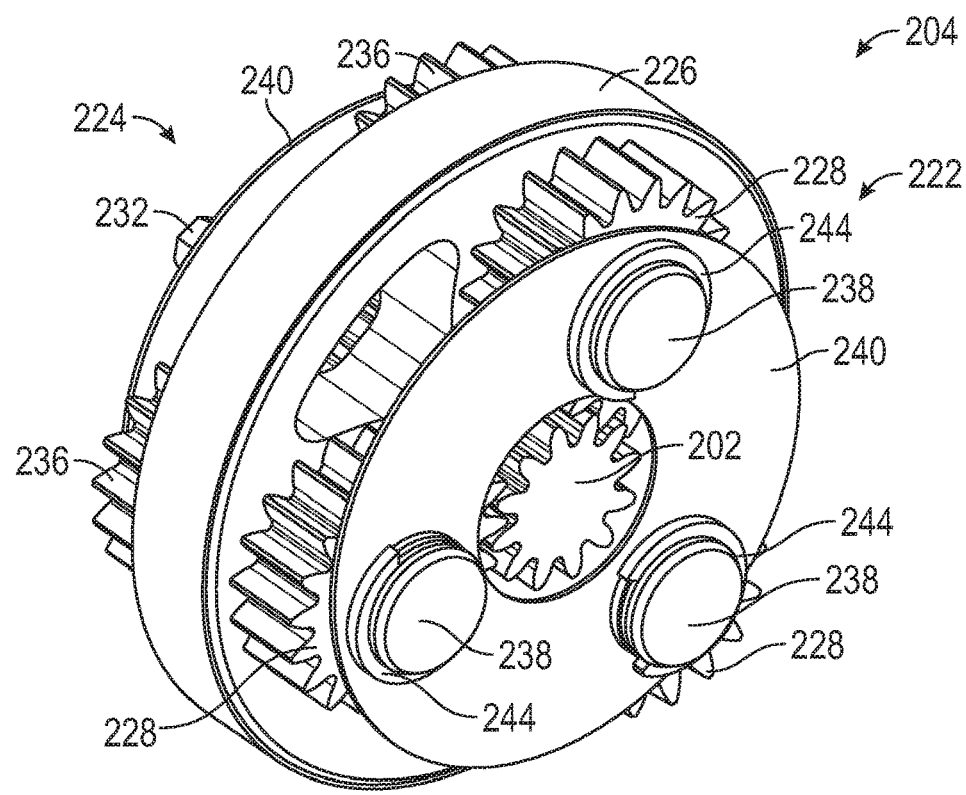
FIG. 13 is a front, top, right isometric view of the assembled carrier assembly of FIG. 12.

In the illustrated non-limiting example, the first sun gear 202 may be centrally arranged with respect to the planet gears 228 and may include a shaft 230 extending axially from one side thereof (see, e.g., FIG. 8). The shaft 230 may include a tip 232 arranged at axial-opposed end of the shaft 230 relative to the first sun gear 202, and a slot 233 arranged axially between the tip 232 and the first sun gear 202. In the illustrated non-limiting example, the tip 232 defines a generally hexagonal shape to enable the input shaft 210 to be rotationally coupled to the first sun gear 202, such that the input shaft 210 and the first sun gear 202 rotate with one another. In other non-limiting examples, the tip 232 may define any anti-rotational geometric shape (e.g., oval, square, triangular, polygonal, etc.) that enables the input shaft 210 to be rotationally coupled to the first sun gear 202 for rotation therewith. The slot 233 may be recessed radially inwardly into the shaft 230.

The shaft 230 of the first sun gear 202 may be received within and inserted through a center aperture 234 that extends axially through the carrier plate 226. The shaft 230 may also extend axially through the second sun gear 208, such that the tip 232 of the shaft 230 and the slot 233 axially protrude from the second sun gear 208. Although the shaft 230 extends through the second sun gear 208, the first sun gear 202 may be independently rotatable relative to the second sun gear 208. A snap ring 235 may be inserted into the slot 233 to prevent the shaft 230, and thereby the first sun gear 202, from displacing axially relative to the carrier plate 226.

In the illustrated non-limiting example, the second set of planet gears 224 may include three planet gears 236 arranged circumferentially around and meshed with the second sun gear 208. In other non-limiting examples, the second set of planet gears 224 may include more or less than three planet gears 236 arranged circumferentially around and meshed with the second sun gear 208. The second sun gear 208 may be arranged centrally with respect to the planet gears 236 and may define an axial height that is sufficient to ensure at least a portion of the second sun gear 208 protrudes axially past the planet gears 236. That is, the second sun gear 208 defines an axial height that is greater than the axial height defined by the planet gears 236 to allow at least a portion of the second sun gear 208 to axially protrude past the planet gears 236 (e.g., in a direction away from the carrier plate 226.

The planet gears 228 of the first set of planet gears 222 and the planet gears 236 of the second set of planet gears 224 may be axially fixed relative to the carrier plate 226. For example, as illustrated in FIGS. 10-13, the carrier assembly 204 may include a plurality of bearing rods 238 and a pair of ring plates 240. Each of the plurality of bearing rods 238 may include a pair of slots 242 arranged on axially opposing ends thereof. The slots 242 may extend radially inwardly into the respective bearing rod 238. Each of the bearing rods 238 may be axially inserted through one of the planet gears 228 of the first set of planet gears 222, a rod aperture 243 in the carrier plate 226 (see, e.g., FIG. 7), one of the planet gears 236 of the second set of planet gears 224, and both of the ring plates 240. A snap ring 244 may be inserted into each of the slots 242 on an axially outward surface of the ring plates 240 (e.g., a surface of the ring plate arranged away from the carrier plate 226). In this way, for example, each of the planet gears 228 of the first set of planet gears 222 and each of the planet gears 236 of the second set of planet gears 224 may be prevented from displacing axially relative to the carrier plate 226.

Figure 14:
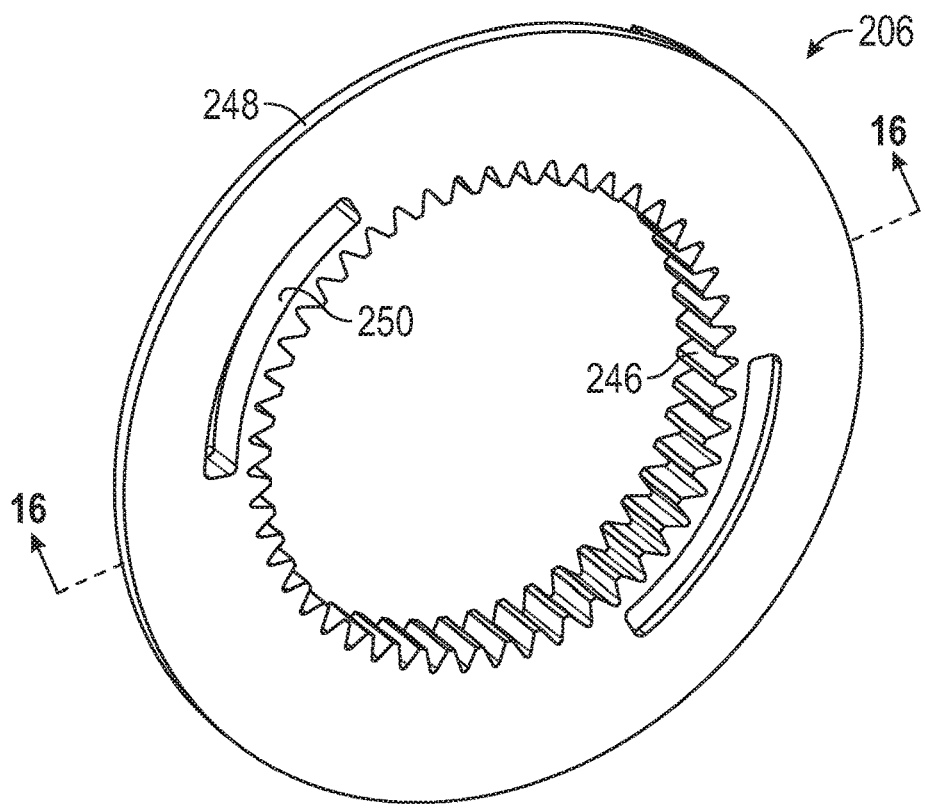
FIG. 14 is a back, top, left isometric view of a second ring gear of the planetary actuator of FIG. 3.
Figure 15:
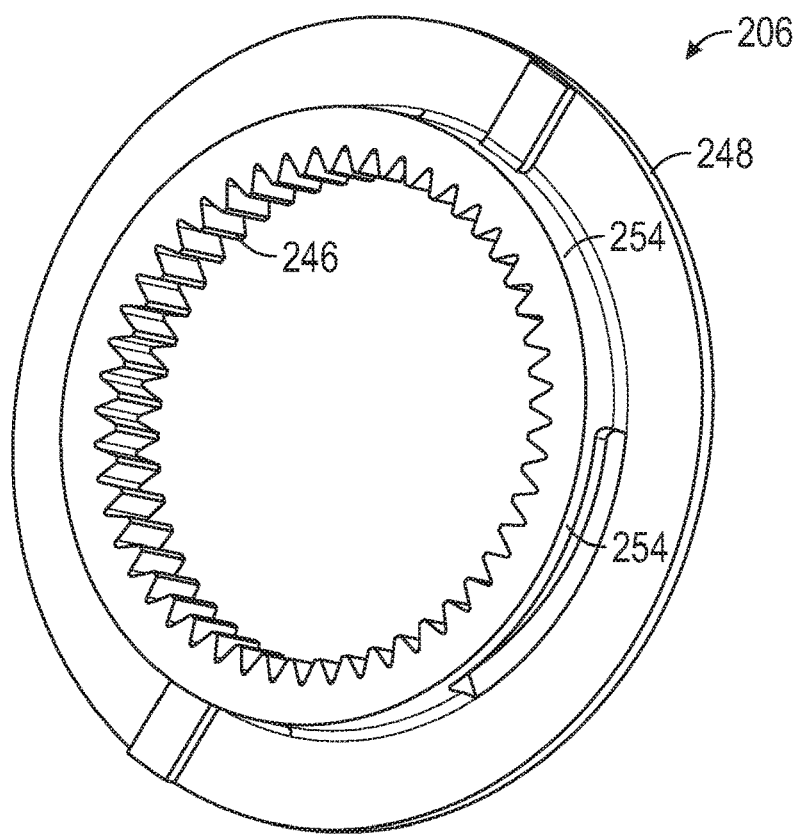
FIG. 15 is a front, top, left isometric view of the second ring gear of FIG. 14.
Figure 16:
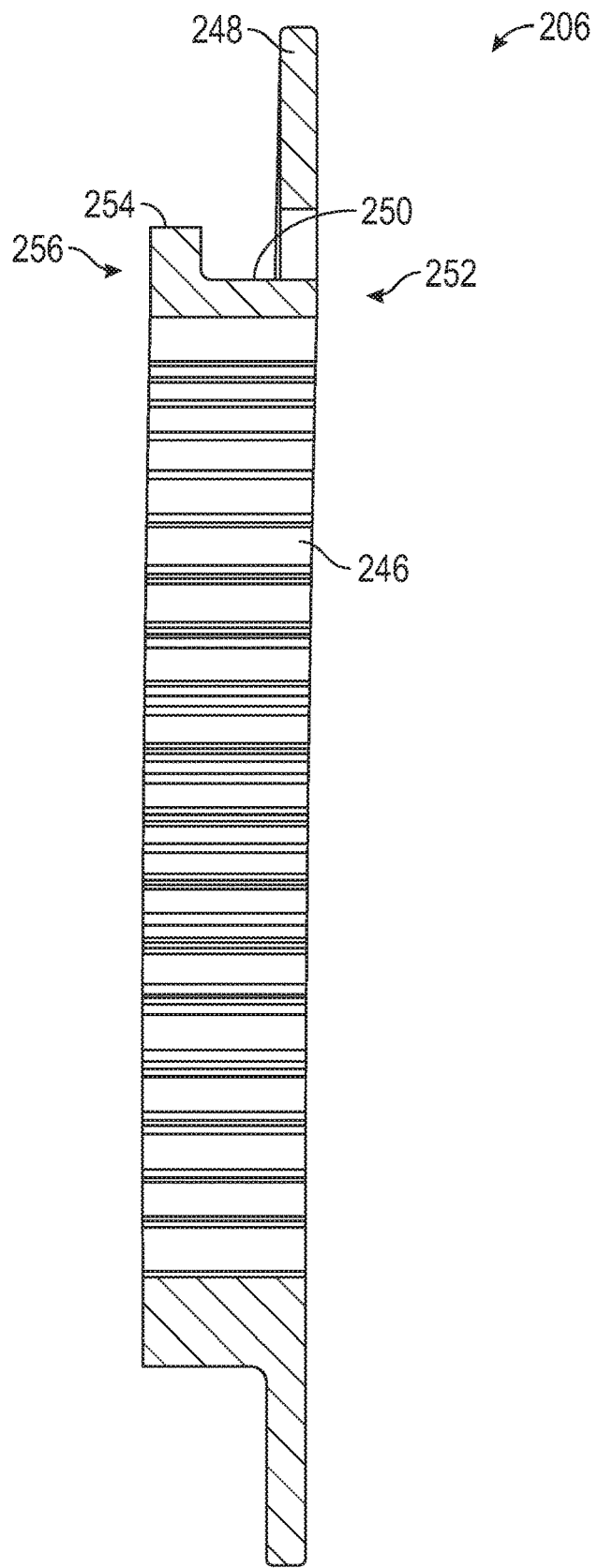
FIG. 16 is a cross-sectional view of the second ring gear of FIG. 14 taken along line 16-16.

With reference to FIGS. 14-16, the second ring gear 206 may include an inner, geared surface 246 and a flange 248, and a pair of circumferential slots 250. The geared surface 246 may include a plurality of gear teeth extending circumferentially around the geared surface 246. The flange 248 may extend radially outwardly from a first axial end 252 of the second ring gear 206. The pair of circumferential slots 250 extend axially through the flange 248 and radially into an outer surface 254 of the second ring gear 206. The slots 250 may axially along the outer surface 254 from the first axial end 252 of the second ring gear 206 to a location between the first axial end 252 and a second axial end 256 of the second ring gear 206. In the illustrated non-limiting example, the slots 250 are arranged on circumferentially opposed sides of the flange 248 and each extend circumferentially around a portion of the flange 248.

Figure 17:
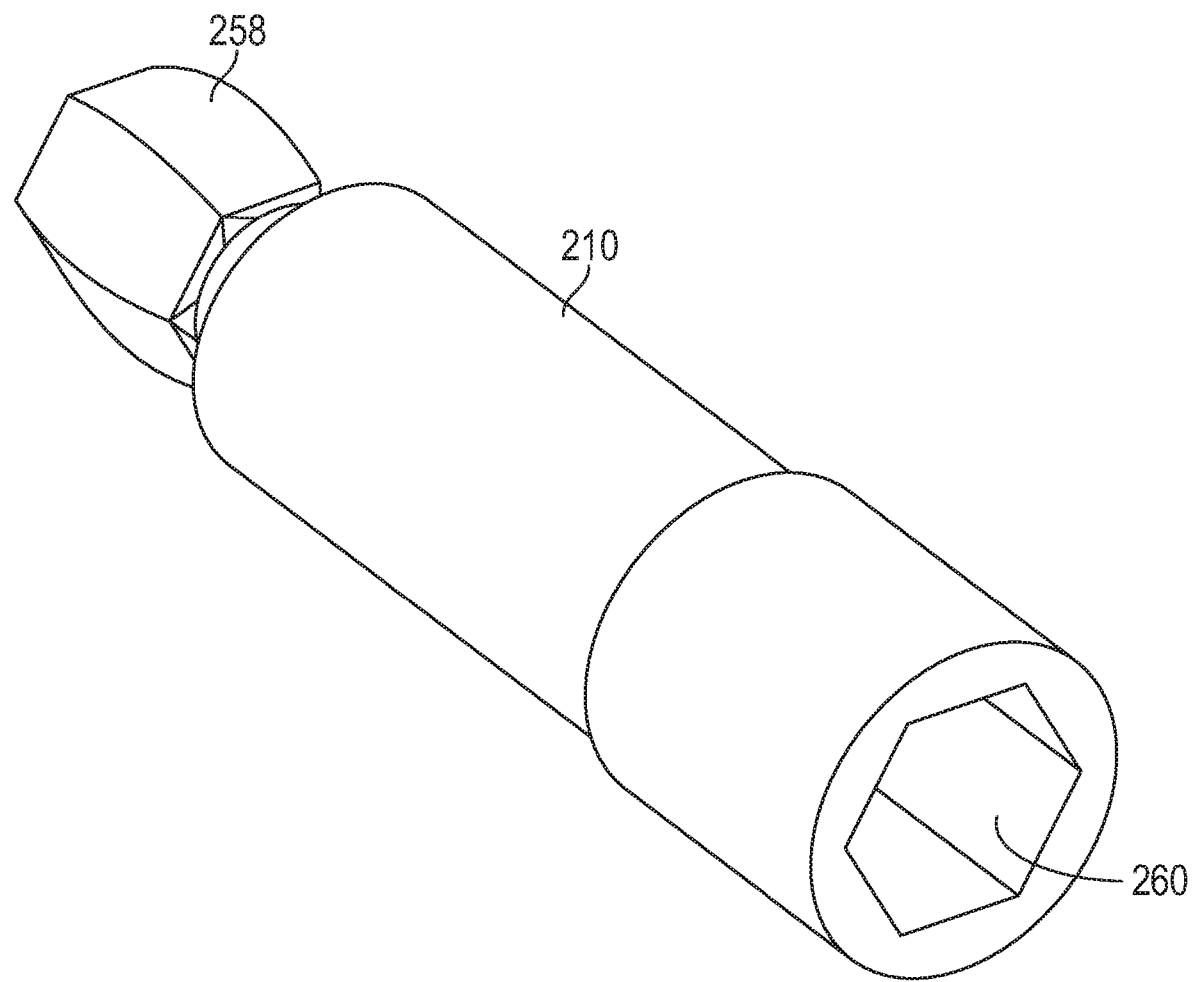
FIG. 17 is a front, top, left isometric view of an input shaft of the planetary actuator of FIG. 3.

As illustrated in FIG. 17, the input shaft 210 includes an input tip 258 arranged at one axial end thereof and a coupling aperture 260 arranged at an axially opposing end thereof. The input tip 258 may define a generally hexagonal shape to enable, for example, a rotary actuator to be coupled to the input shaft 210. In other non-limiting examples, the input tip 258 may define any anti-rotational geometric shape (e.g., oval, square, triangular, polygonal, etc.) that enables the input shaft 210 to be rotationally coupled to a rotary actuator for rotation therewith.

The coupling aperture 260 extends axially into the input shaft 210 and defines a generally hexagonal shape to match the shape defined by the tip 232 of the shaft 230 attached to the first sun gear 202. In this way, for example, the tip 232 may be inserted into the coupling aperture 260 to enable the input shaft 210 to be rotationally coupled to the first sun gear 202, such that the input shaft 210 and the first sun gear 202 rotate with one another. In other non-limiting examples, the coupling aperture 260 may define any anti-rotational geometric shape (e.g., oval, square, triangular, polygonal, etc.) that matches the shape of the tip 232 of the shaft 230.

Figure 18:
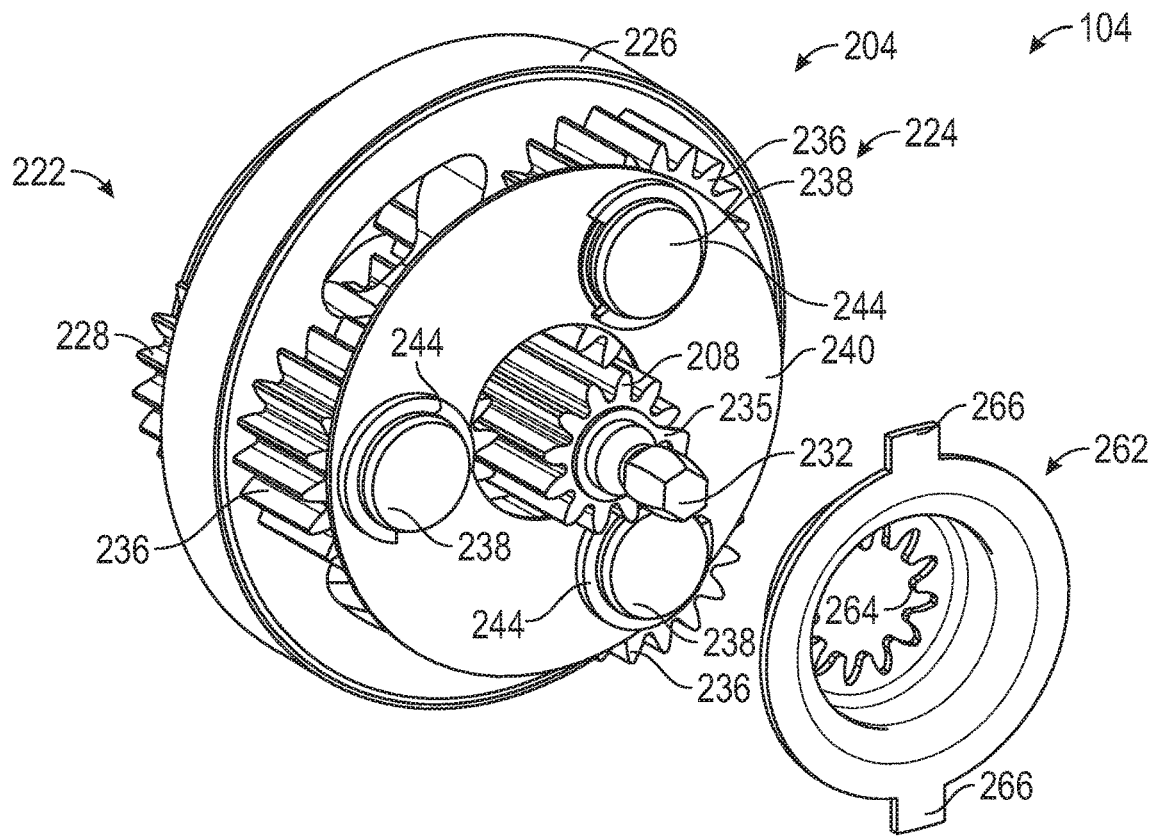
FIG. 18 is a partially-exploded back, top, left isometric view of a carrier assembly and an anti-rotation ring of the planetary actuator of FIG. 3.
Figure 19:
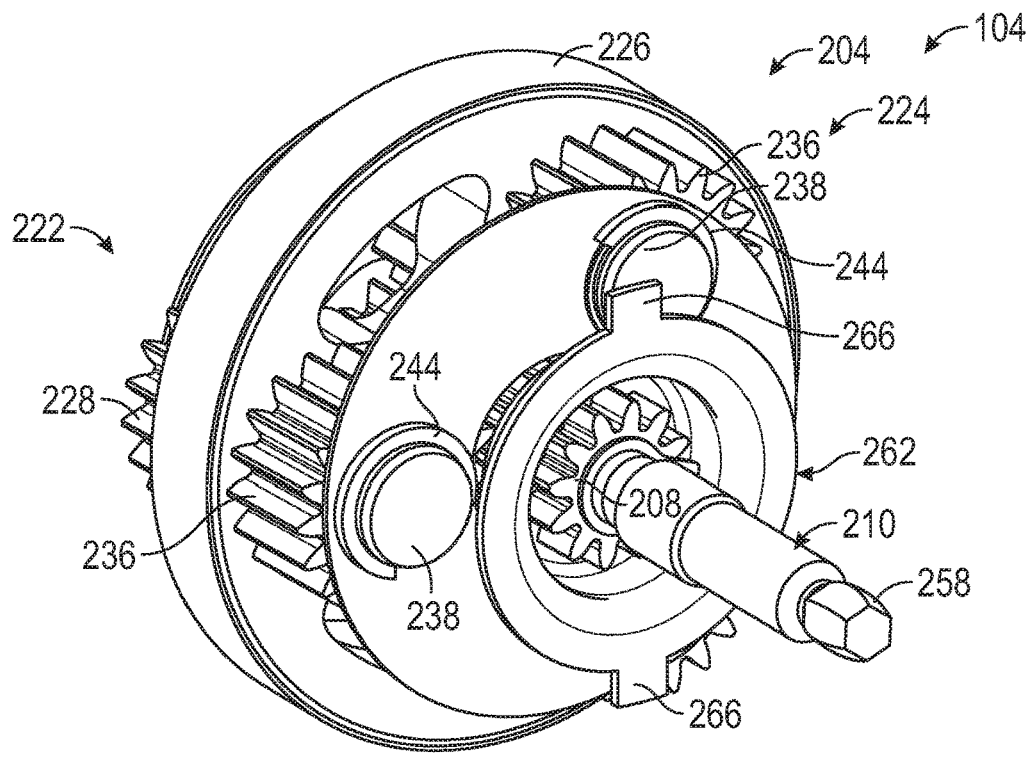
FIG. 19 is a back, top, left isometric view of the anti-rotation ring of FIG. 18 installed on the carrier assembly.
Figure 20:
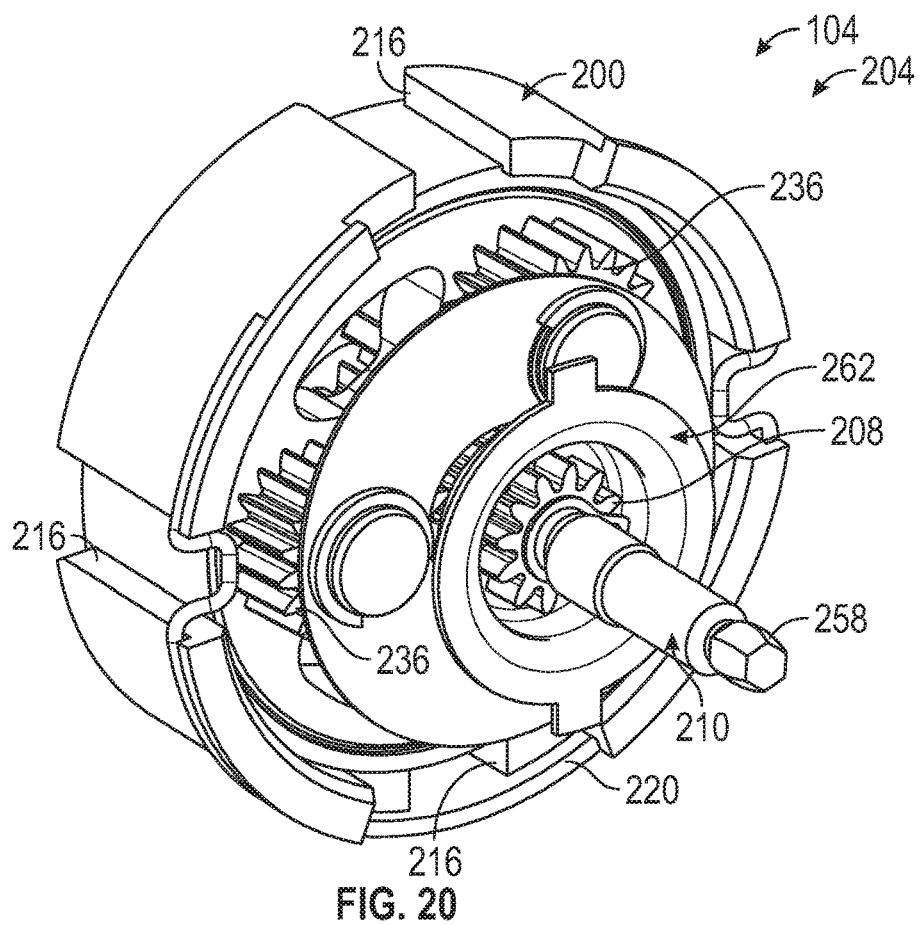
FIG. 20 is a back, top, left isometric view of the planetary actuator of FIG. 3 partially assembled.
Figure 21:
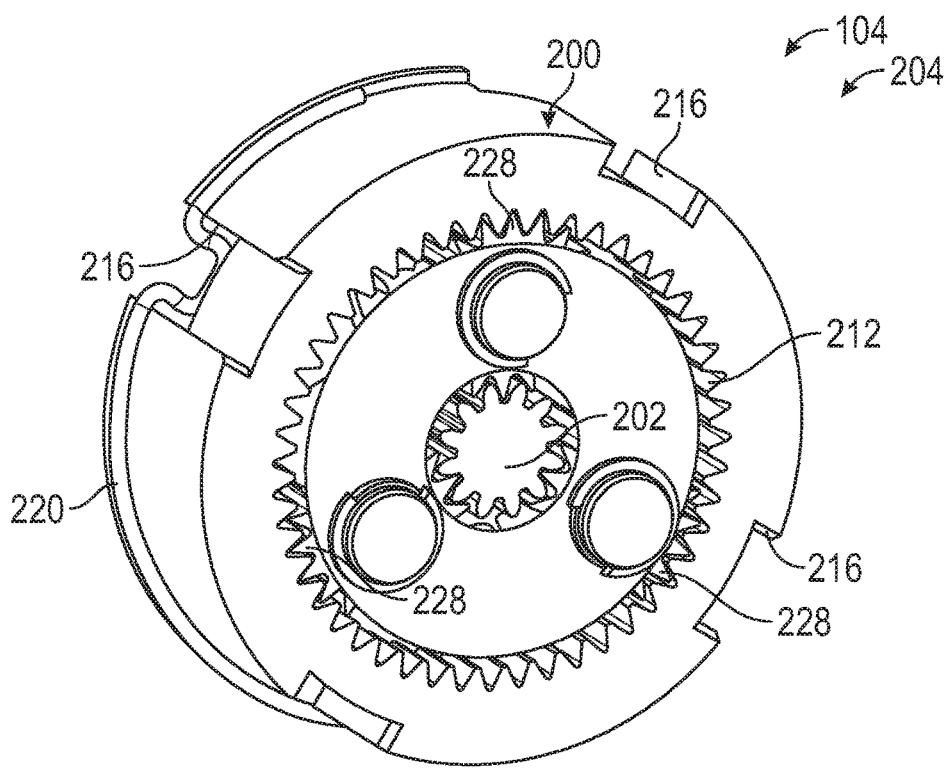
FIG. 21 is a front, top, right isometric view of the planter actuator of FIG. 20.
Figure 22:
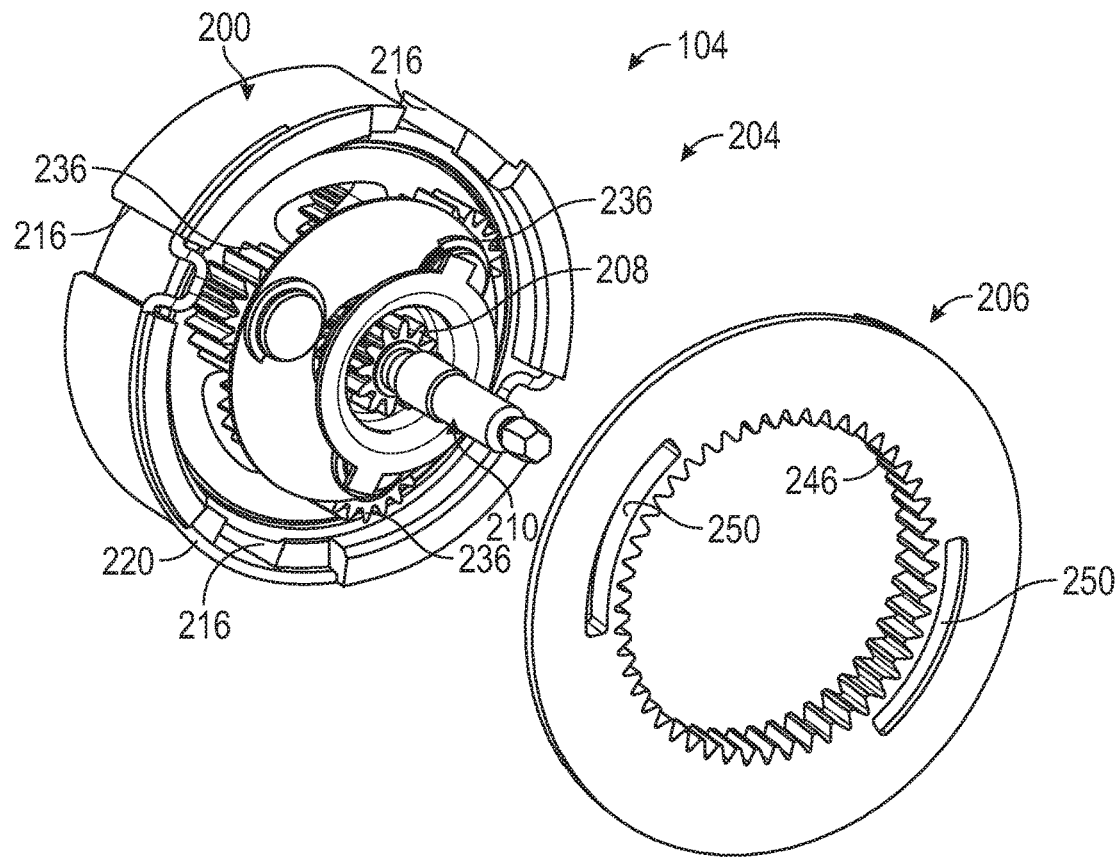
FIG. 22 is a partially-exploded back, top, left isometric view of the planter actuator of FIG. 3 with a first ring gear exploded out.
Figure 23:
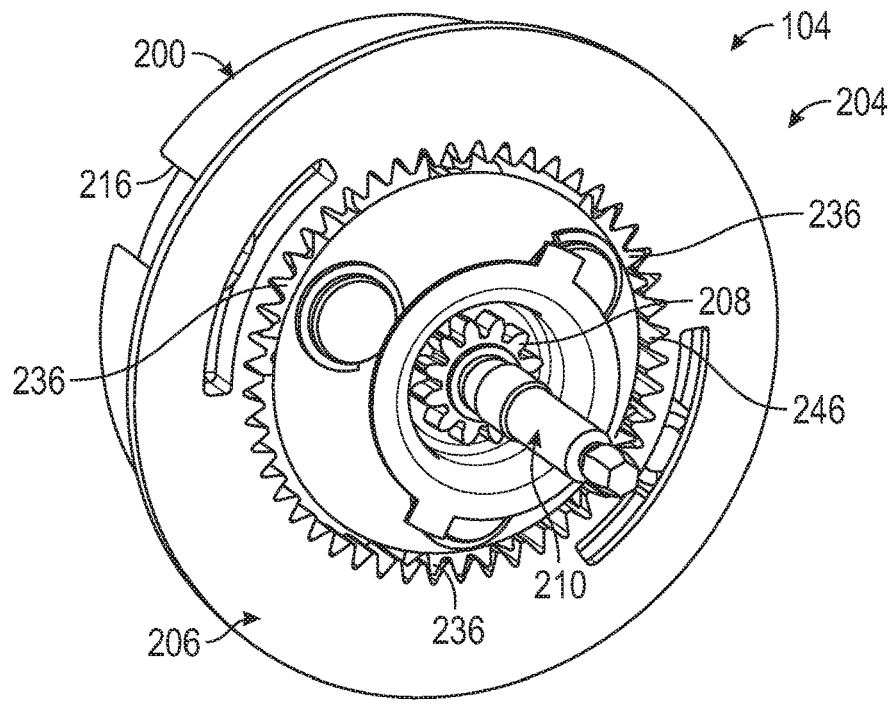
FIG. 23 is a back, top, left isometric view of the planetary actuator of FIG. 3 assembled.
Figure 24:
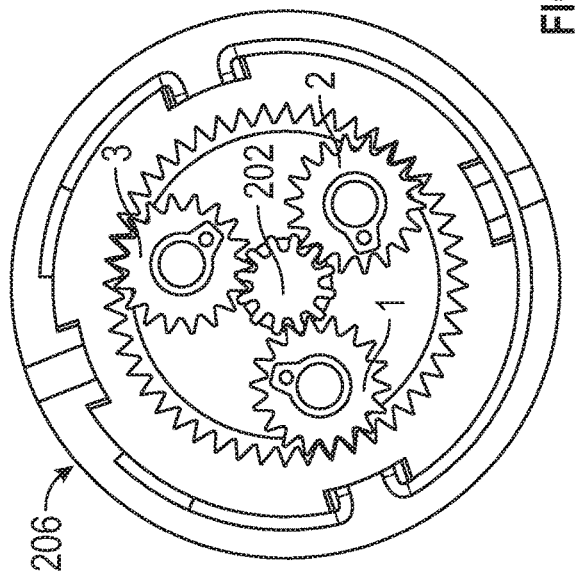
FIG. 24 is a back view of the planetary actuator of FIG. 3 in a steady state mode at a first rotary position.
Figure 25:
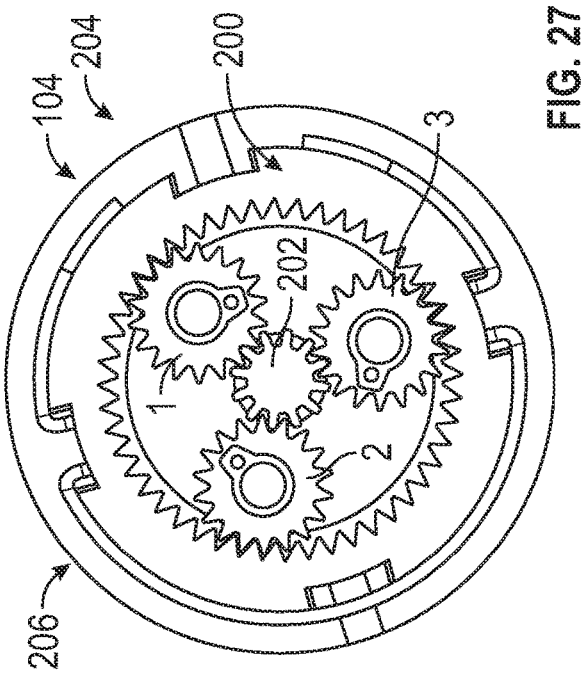
FIG. 25 is a back view of the planetary actuator of FIG. 3 in a steady state mode at a second rotary position.
Figure 26:
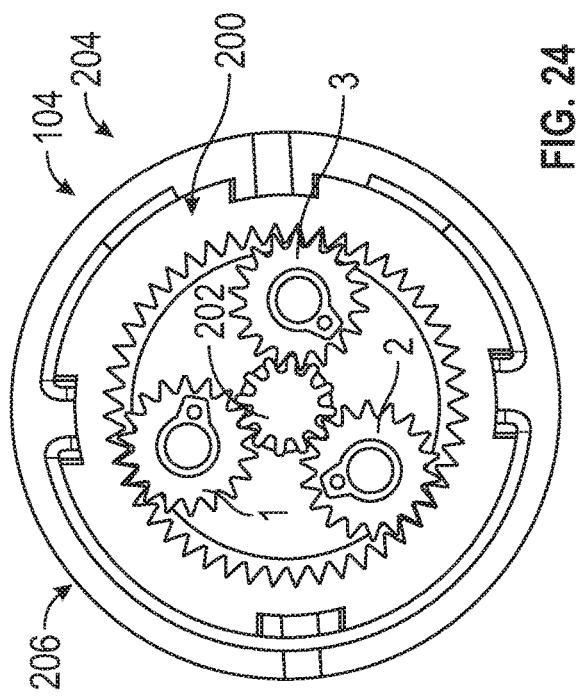
FIG. 26 is a back view of the planetary actuator of FIG. 3 in a steady state mode at a third rotary position.
Figure 27:
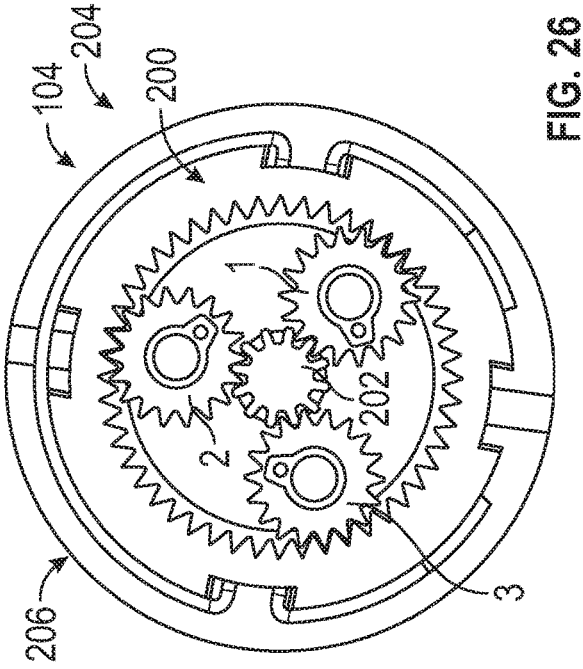
FIG. 27 is a back view of the planetary actuator of FIG. 3 in a steady state mode at a fourth rotary position.

In general, one of the first sun gear 202 and the second sun gear 208 may be rotationally fixed to prevent rotation. In the illustrated non-limiting example of FIGS. 18 and 19, the second sun gear 208 may be coupled to an anti-rotation ring 262. The axial protrusion of the second sun gear 208 past the planet gears 236 of the second set of planet gears 224 provides access to the second sun gear 208 for the anti-rotation ring 262 to be axially inserted over a portion of the second sun gear 208. In the illustrated non-limiting example, the anti-rotation ring 262 includes an inner surface 264 that matches the gear profile of the second sun gear 208 to enable the inner surface 264 to be axially inserted onto the second sun gear 208. The anti-rotation ring 262 may include one or more tabs 266 that extend radially outwardly from the anti-rotation ring 262. In some non-limiting examples, the tabs 266 may be coupled to an external component that is rotationally fixed, which prevents rotation of the anti-rotation ring 262, and thereby the second sun gear 208. In some non-limiting examples, the first sun gear 202 may be rotationally fixed and the second sun gear 208 may be coupled to the input shaft 210 for rotation therewith.

With reference to FIGS. 20-23, the assembled carrier assembly 204 may be inserted at least partially into the cavity 215 of the first ring gear 200, such that the geared surface 212 meshes with the planet gears 228 of the first set of planet gears 222. The second ring gear 206 may be inserted onto the carrier assembly 204, such that the geared surface 246 meshes with the planet gears 236 of the second set of planet gears 224.

In general, during operation of the planetary actuator 104, the first ring gear 200 and the second ring gear 206 may be able to rotate freely in a desired direction. For example, with the geared surface 212 meshed with the planet gears 228 of the first set of planet gears 222, the first ring gear 200 may be able to rotate about the first sun gear 202. Similarly, the with the geared surface 246 meshed with the planet gears 236 of the second set of planet gears 224, the second ring gear 206 may be able to rotate about the second sun gear 208.

Since the second sun gear 208 may be rotationally fixed by the anti-rotation ring 262, the first sun gear 202 may be selectively rotated to alter a rotational relationship between the first ring gear 200 and the second ring gear 206. For example, the input shaft 210 may be selectively rotated a desired rotational magnitude in a first direction, which, in turn, rotates the first sun gear 202 rotationally coupled to the input shaft 210 in the first direction. The rotation of the first sun gear 202 in the first direction may result in rotation of planet gears 228 of the first set of planet gears 222 in a direction opposite to the first direction which, finally, rotates the first ring gear 200 relative to the second ring gear 206 in the direction opposite to the first direction. The magnitude of the relative rotation, or rotational offset, between the first ring gear 200 and the second ring gear 206 may be dependent on the gear ratio defined between the input shaft 210 and the first ring gear 200. For example, a resultant gear ratio that accounts for each of the gear ratio between the input shaft 210 to the first sun gear 202, the gear ratio between the first sun gear 202 and the planet gears 228 of the first set of planet gears 222, and the gear ratio between the planet gears 228 of the first set of planet gears 222 and the first ring gear 200. In any case, with the resultant gear ratio known, the number of degrees that the input shaft 210 is rotated may correlate with a known number of degrees that the first ring gear 200 is rotated relative to the second ring gear 206. Thus, a direction and magnitude of the rotation of the input shaft 210 may be correlated with a predetermined direction and magnitude of the relative rotation, or rotational offset, between the first ring gear 200 and the second ring gear 206.

In some applications, the first ring gear 200 may be rotationally coupled to a first rotary component (e.g., a cam shaft of an internal combustion engine, a rotor on an electric motor, etc.) for rotation therewith and the second ring gear 206 may be rotationally coupled to a second rotary component (e.g., a crank shaft of an internal combustion engine, a portion of the rotor of an electric motor, etc.) for rotation therewith. The second rotary component may be driven at a given rotational speed by the first rotary component, which may drive the second rotary component at a rotational speed that may be same as or different than the given rotational speed of the first rotary component.

In some applications, the planetary actuator 104 may be rotationally coupled between the first rotary component and the second rotary component to selectively impart relative rotation, or a rotational offset, between the first rotary component and the second rotary component. In general, the planetary actuator 104 may be operable in a steady-state mode where the rotational relationship between the first rotary component and the second rotary component is maintained, and a phasing mode where the rotational relationship between the first rotary component and the second rotary component is offset in a desired direction and a desired magnitude.

FIGS. 24-27 illustrate the planetary actuator 104 operating in a steady-state mode, with the planet gears 228 of the first set of planet gears 222 numbered to track the rotation thereof. As illustrated in FIGS., 24-27, the first ring gear 200 and the second ring gear 206 are being rotated in a first direction (e.g., counterclockwise from the perspective of FIGS. 24-27). As described herein, the first ring gear 200 may be rotationally coupled to a first rotary component that is rotationally driven by rotation of a second rotary component, which is rotationally coupled to the second ring gear 206.

In the steady-state mode, the input shaft 210 may be held rotationally fixed and, thus, the first sun gear 202 may be rotationally fixed due to the rotational coupling between the input shaft 210 and the first sun gear 202. In addition, the second sun gear 208 may be rotationally fixed by the anti-rotation ring 262. With the first sun gear 202 and the second sun gear 208 being rotationally fixed, the planet gears 228 of the first set of planet gears 222 may rotate around the first sun gear 202 due to rotation of the first ring gear 200, and the planet gears 236 of the second set of planet gears 224 may rotate around the second sun gear 208 due to rotation of the second ring gear 206. As such, the relative rotational orientation between the first ring gear 200 and the second ring gear 206, and thereby between the first rotary component and the second rotary component, may be maintained in the steady-state mode. In the illustrated non-limiting example, the first ring gear 200 and the second ring gear 206 are being rotated at the same rotational speed in the steady-state mode. In other non-limiting examples, the first ring gear 200 and the second ring gear 206 may be rotated at different rotational speeds, depending on the application.

Figure 28:
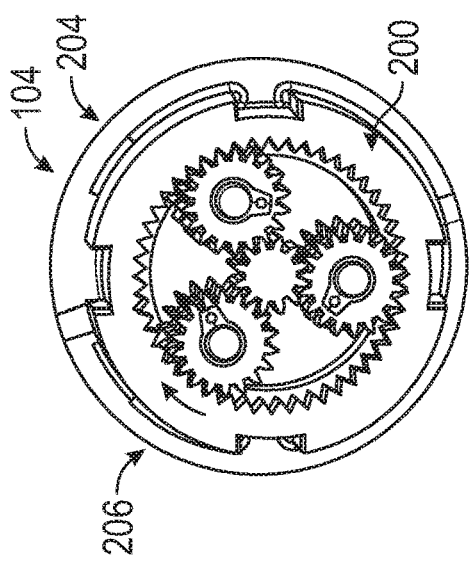
FIG. 28 is a back view of the planetary actuator of FIG. 3 in a phasing mode at a first phasing position in a first direction.
Figure 29:
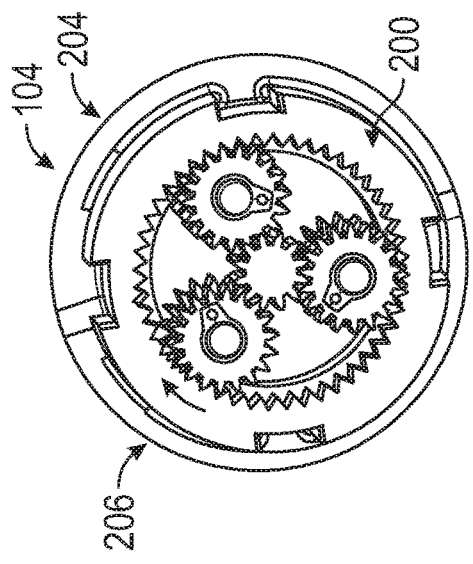
FIG. 29 is a back view of the planetary actuator of FIG. 3 in a phasing mode at a second phasing position in a first direction.
Figure 30:
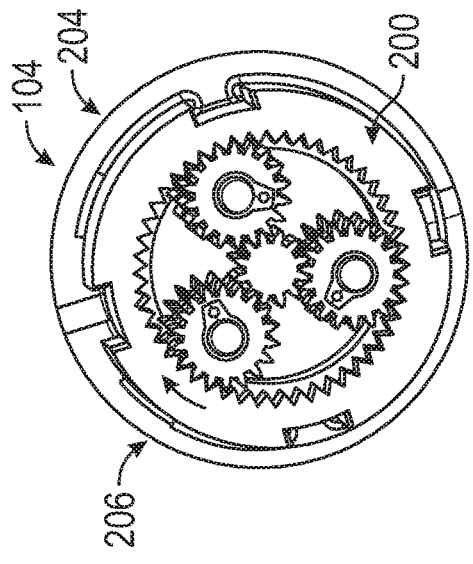
FIG. 30 is a back view of the planetary actuator of FIG. 3 in a phasing mode at a third phasing position in a first direction.

FIGS. 28-30 illustrate the planetary actuator 104 operating in the phasing mode, with the phasing occurring in a first direction. As illustrated in FIGS. 28-30, the first ring gear 200 may be selectively rotated relative to the second ring gear 206 in a first direction (e.g., clockwise from the perspective of FIGS. 28-30). To facilitate the rotation of the first ring gear 200 relative to the second ring gear 206, the input shaft 210 in the first direction, which may be rotationally coupled to a rotary actuator, may be rotated in a second direction opposite to the first direction. The rotation of the input shaft 210 in the second direction results in rotation of the first sun gear 202 in the second direction. Rotation of the first sun gear 202 in the second direction results in rotation of the planet gears 228 of the first set of planet gears 222 in the first direction, which rotates the first ring gear 200 in the first direction. With the second sun gear 208 being rotationally fixed, this selective rotation of the first sun gear 202, and thereby the first ring gear 200, allows the first ring gear 200 to rotate relative to the second ring gear 206 in the first direction.

Figure 31:
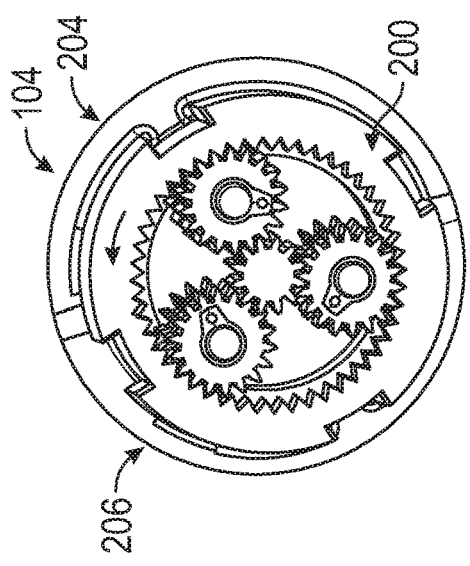
FIG. 31 is a back view of the planetary actuator of FIG. 3 in a phasing mode at a first phasing position in a second direction.
Figure 32:
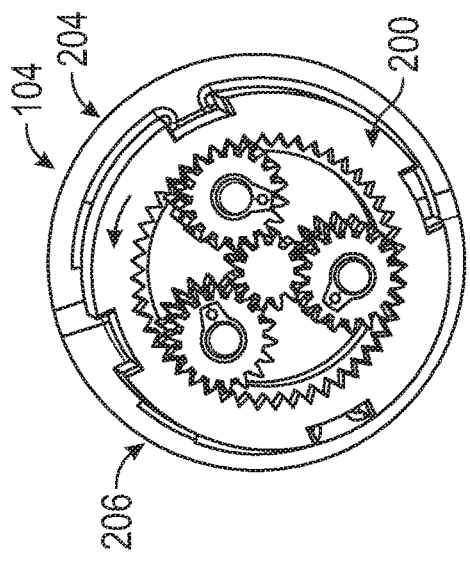
FIG. 32 is a back view of the planetary actuator of FIG. 3 in a phasing mode at a second phasing position in a second direction.
Figure 33:
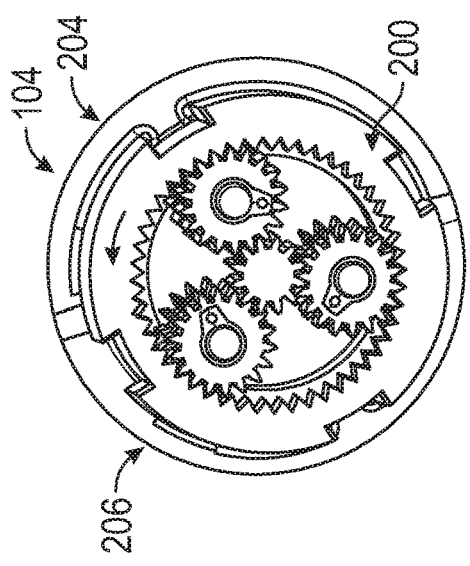
FIG. 33 is a back view of the planetary actuator of FIG. 3 in a phasing mode at a third phasing position in a second direction.
Figure 34:
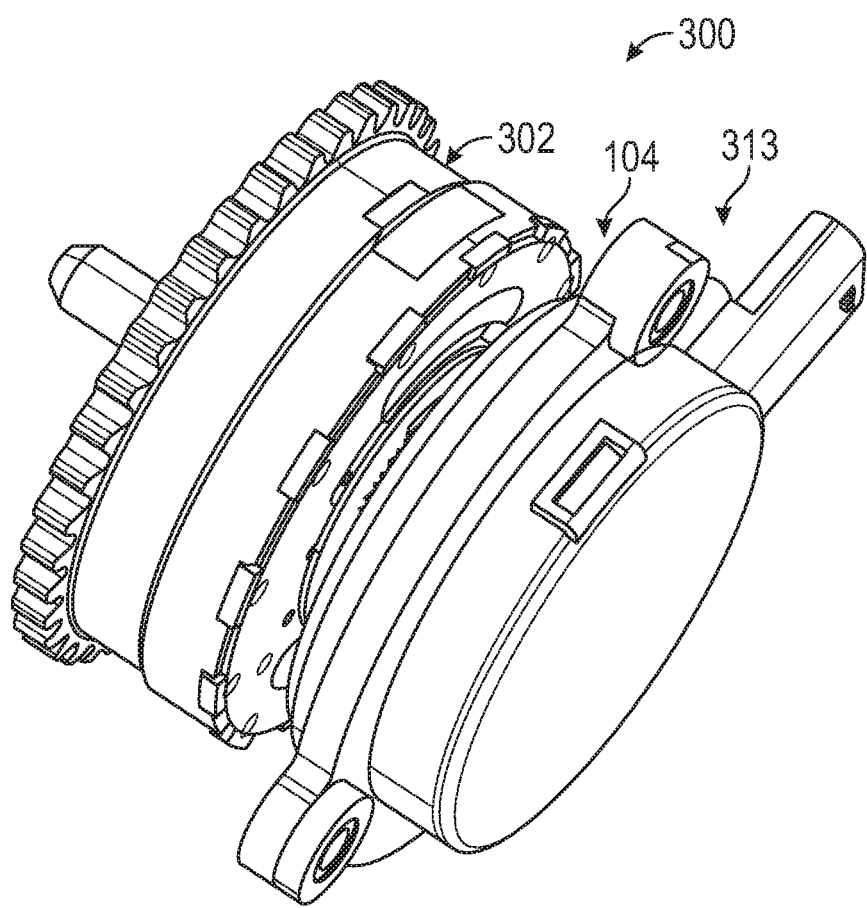
FIG. 34 is a back, top, left isometric view of a cam phasing system according to the present disclosure.
Figure 35:
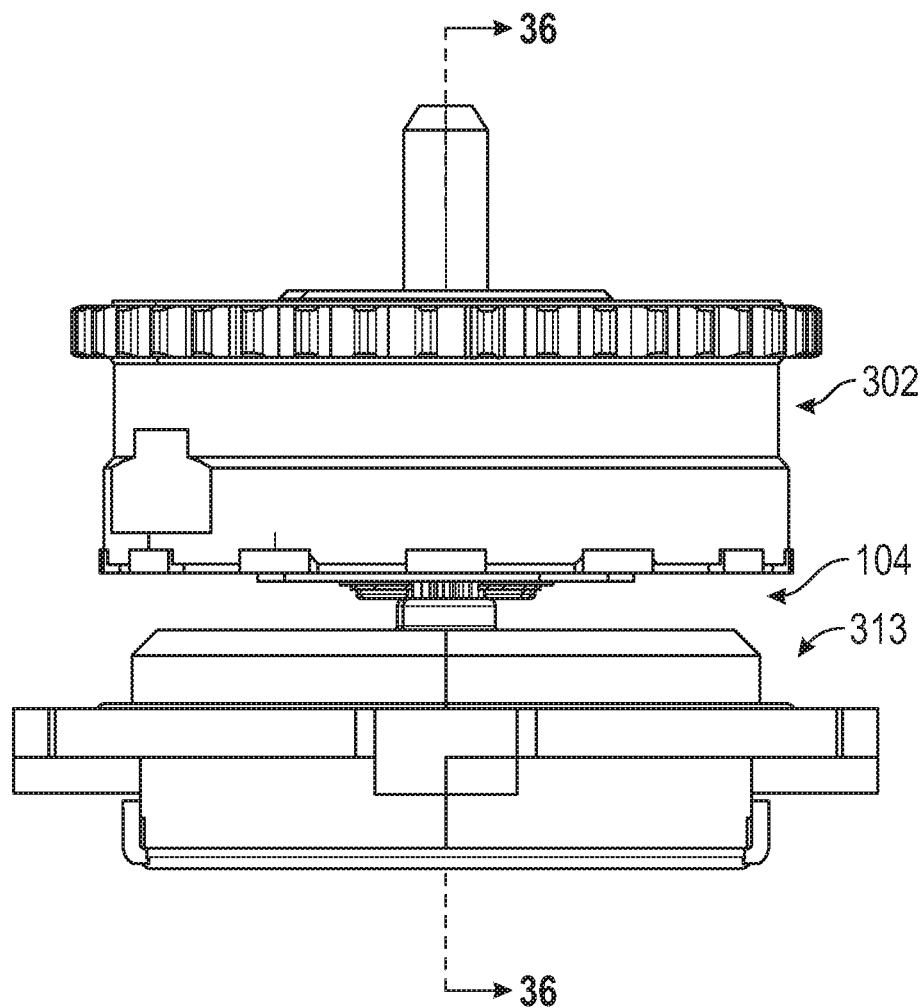
FIG. 35 is a left side view of the cam phasing system of FIG. 34.
Figure 36:
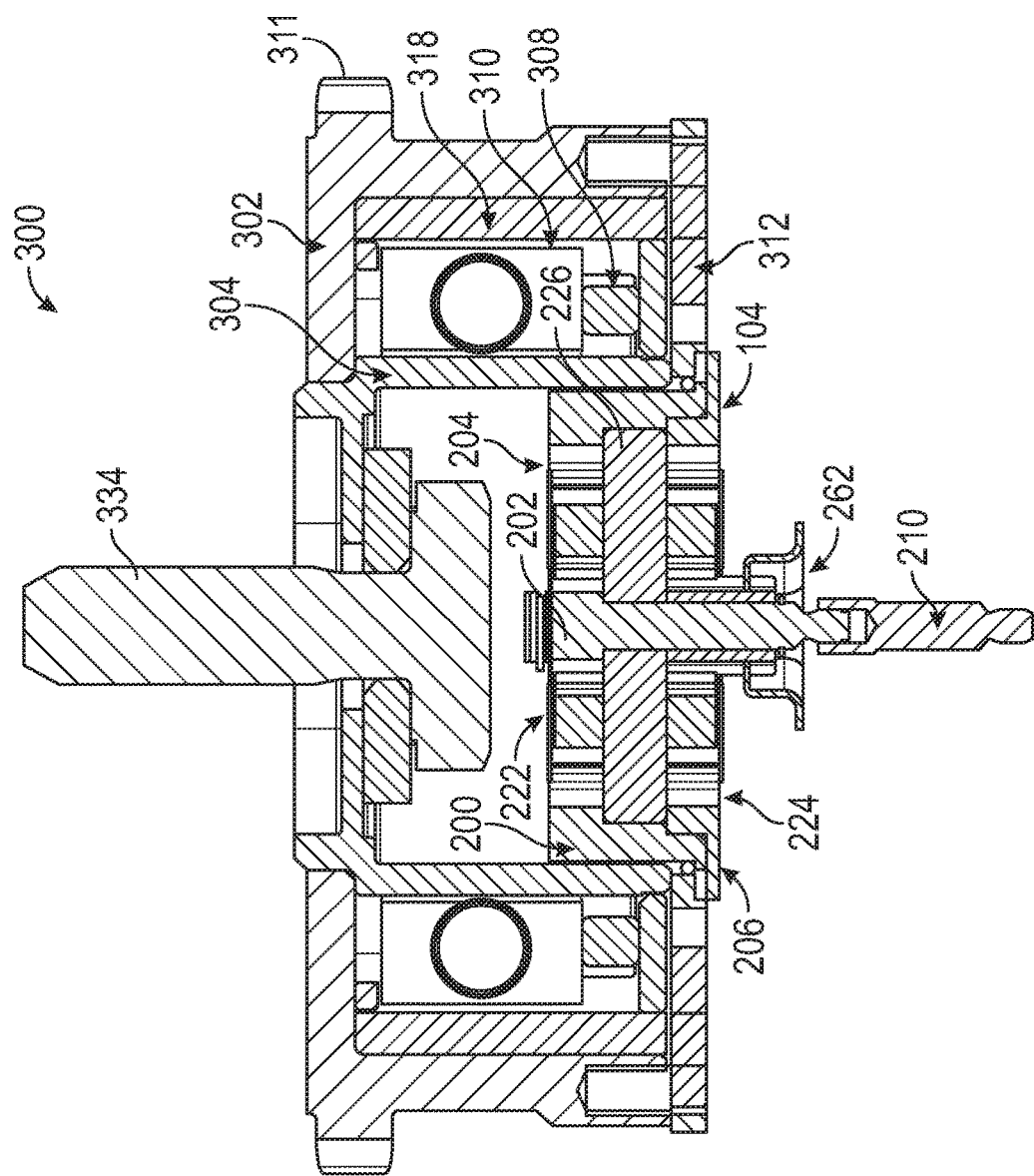
FIG. 36 is a partial cross-sectional view of the cam phasing system of FIG. 35 taken along ling 36-36.
Figure 37:
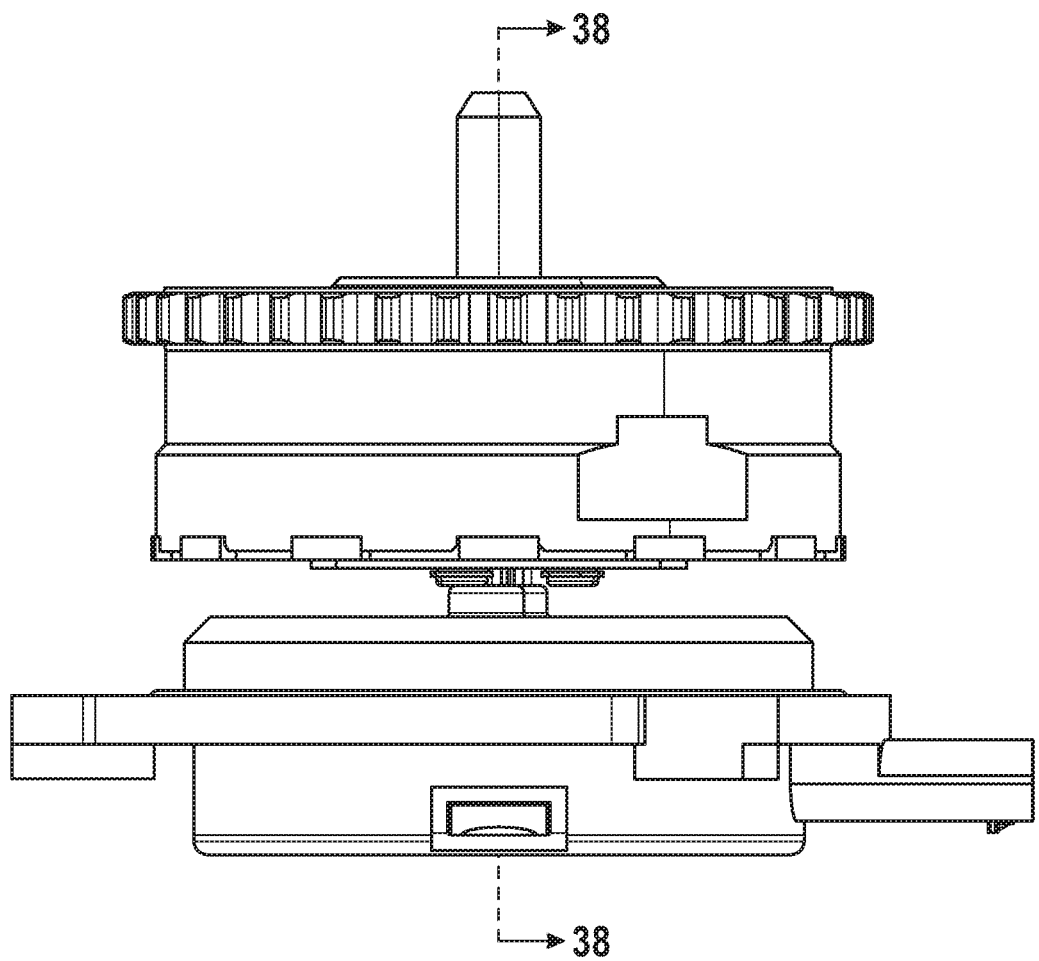
FIG. 37 is a front view of the cam phasing system of FIG. 34.
Figure 38:
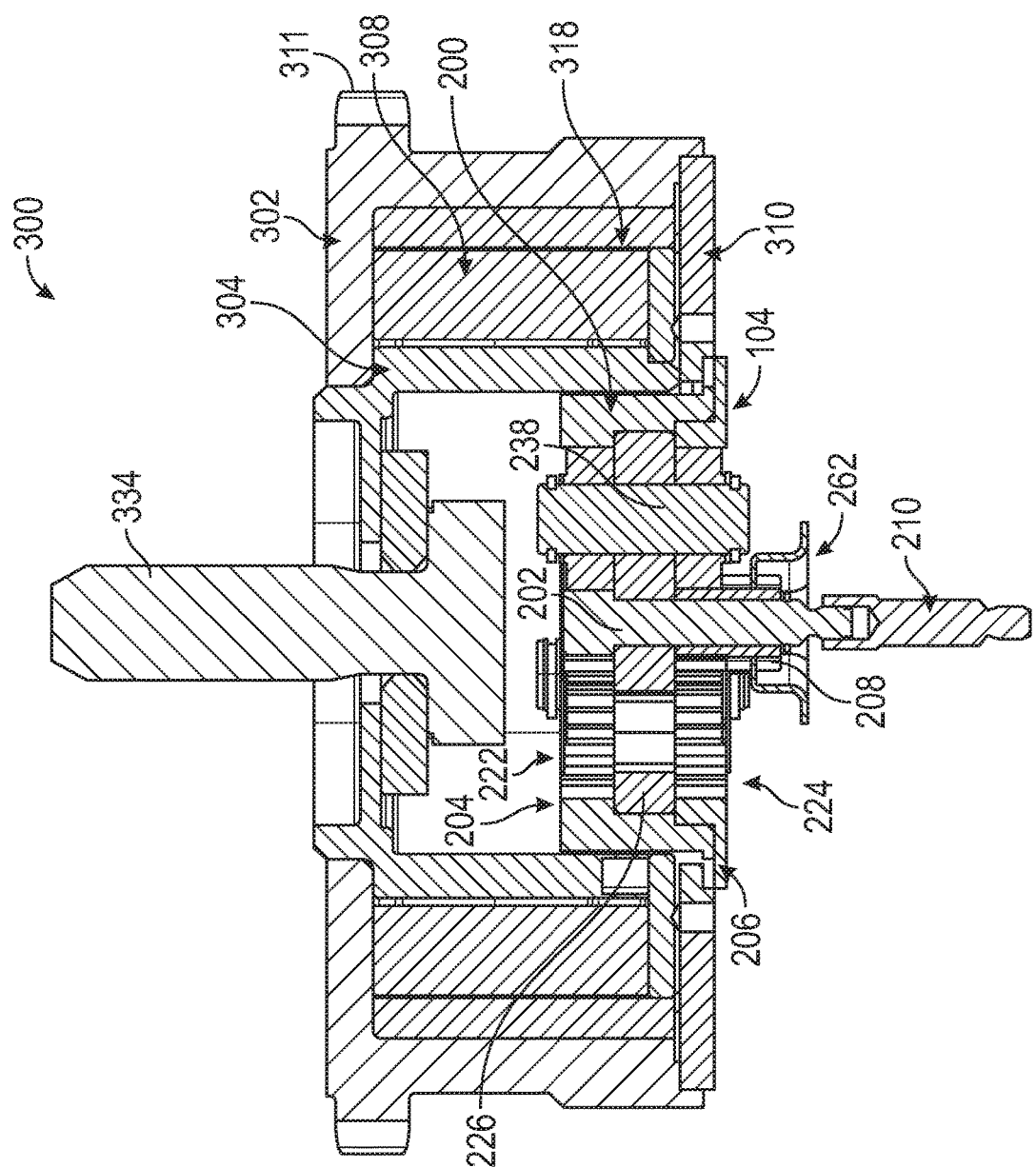
FIG. 38 is a cross-sectional view of the cam phasing system of FIG. 37 taken along line 38-38.
Figure 39:
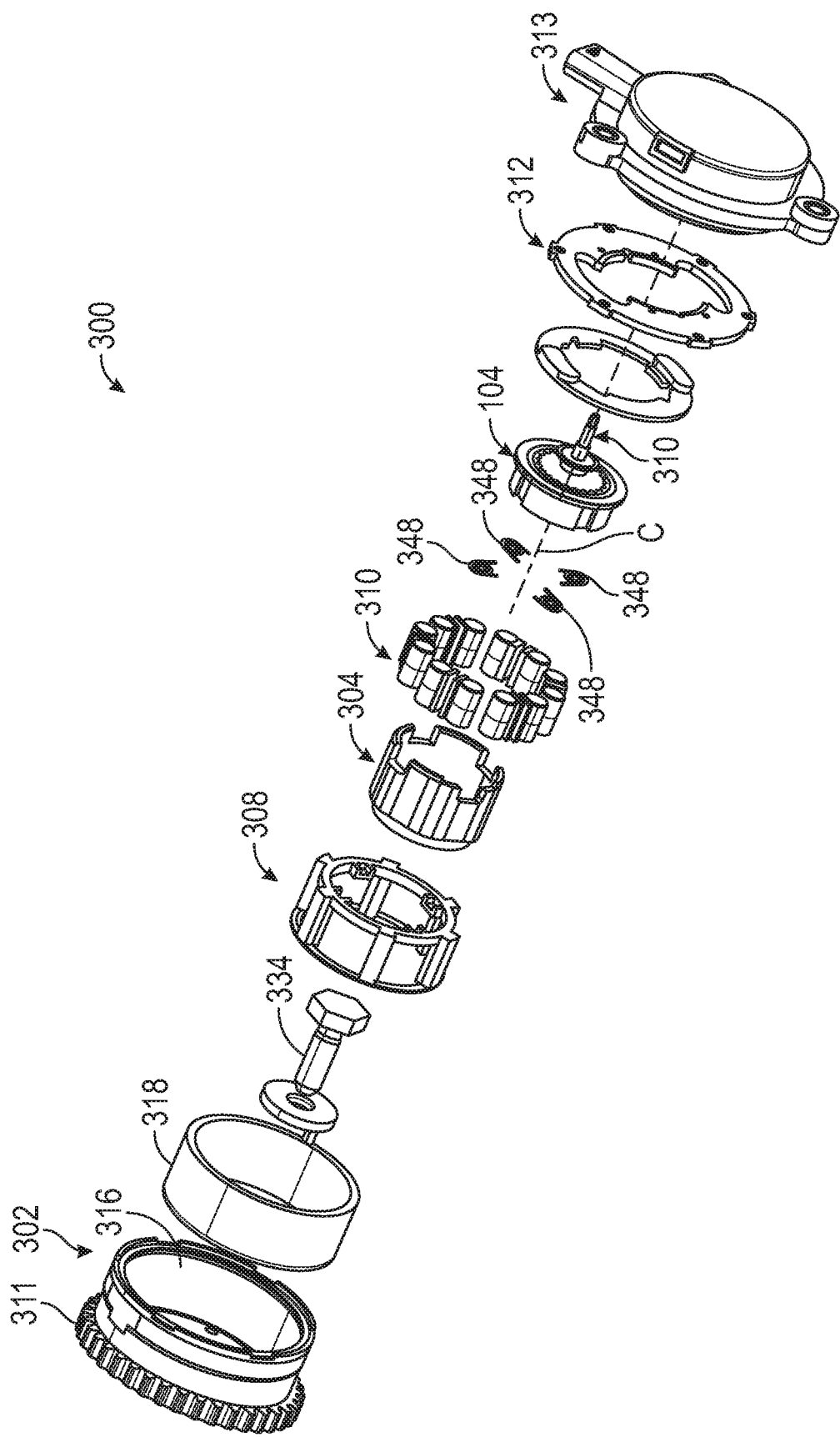
FIG. 39 is an exploded back, top, left isometric view of the cam phasing system of FIG. 34.

FIGS. 31-33 illustrate the planetary actuator 104 operating in the phasing mode, with the phasing occurring in a second direction. As illustrated in FIGS. 28-30, the first ring gear 200 may be selectively rotated relative to the second ring gear 206 in a second direction (e.g., counterclockwise from the perspective of FIGS. 31-33). To facilitate the rotation of the first ring gear 200 relative to the second ring gear 206 in the second direction, the input shaft 210, which may be rotationally coupled to a rotary actuator, may be rotated in a first direction opposite to the second direction. The rotation of the input shaft 210 in the first direction results in rotation of the first sun gear 202 in the first direction. Rotation of the first sun gear 202 in the first direction results in rotation of the planet gears 228 of the first set of planet gears 222 in the second direction, which rotates the first ring gear 200 in the second direction. With the second sun gear 208 being rotationally fixed, this selective rotation of the first sun gear 202, and thereby the first ring gear 200, allows the first ring gear 200 to rotate relative to the second ring gear 206 in the second direction.

As described herein, the amount of relative rotation between the first ring gear 200 and the second ring gear 206 may be determined by the known gear ratio between the input shaft 210 and the first ring gear 200. It should be appreciated that FIGS. 28-33 are illustrating the relative rotation between the first ring gear 200 and the second ring gear 206, but in application, the first ring gear 200 and the second ring gear 206 may be rotating while the phasing, or relative rotation is occurring. Further, the design of the planetary actuator 104 allows for full three-hundred and sixty degree relative rotation between the first ring gear 200 (and any other rotary component rotationally coupled thereto) and the second ring gear 206 (and any other rotary component rotationally coupled thereto).

In general, the design and implementation of the planetary actuator 104 only require an input signal (i.e., the input torque/speed/displacement provided from to the input shaft 210, and thereby to the first sun gear 202) to rotate when relative rotation is desired, rather than requiring the input signal to be constantly rotating with either the first ring gear 200 and/or the second ring gear 206. During steady-state operation, when no relative rotation is desired, the input shaft 210 may be rotationally fixed (e.g., stationary). During a change in phase (i.e., relative rotation), the input shaft 210 is not required to rotate at the same speed as either the first ring gear 200 or the second ring gear 206. For example, the input shaft 210, and thereby the first sun gear 202, may only be required to rotate at the rate of change of the relative angle desired. In this way, for example, the rotation (i.e., speed/displacement) of the input shaft 210 in the phasing mode may be proportional to a magnitude of the relative rotation desired between the first ring gear 200 and the second ring gear 206. As such, a power and speed required to rotate the input shaft 210 to achieve the desired relative rotation may be independent of a speed of the first ring gear 200 and/or the second ring gear 206. In addition, in the non-limiting examples, where a gear reduction exists between the input shaft 210 and the second ring gear 206, the gear reduction may reduce an amount of torque required to achieve the desired relative rotation.

In general, the planetary actuator 104 may be utilized in rotary system where selective, controllable relative rotation is desired. For example, the planetary actuator 104 may be implemented in electronic cam phasing systems (e-phasing systems), mechanical cam phasing systems, electric motors, etc. FIGS. 34-39 illustrated one non-limiting example of the planetary actuator 104 installed in a mechanical cam phasing system 300. In the illustrated non-limiting example, the mechanical cam phasing system 300 may include a sprocket hub 302, a cradle rotor 304, a bearing cage, or spider rotor, 308, a plurality of locking assemblies 310, an end cap 312, and the planetary actuator 104. The planetary actuator 104, the sprocket hub 302, the cradle rotor 304, the bearing cage 308 and the end cap 312 can each share a common central axis C, when assembled.

In the illustrated non-limiting example, the mechanical cam phasing system 300 may include a rotary actuator 313. In some non-limiting examples, the rotary actuator 313 may include a stator and a rotor that is electromagnetically coupled to the stator. A current may be applied to the rotary actuator 313 that may result in a rotary output being provided by the rotary actuator 313 in a desired direction at a desired force. In some non-limiting examples, the rotary actuator 313 may be in the form of a brushless DC (BLDC) motor.

Figure 40:
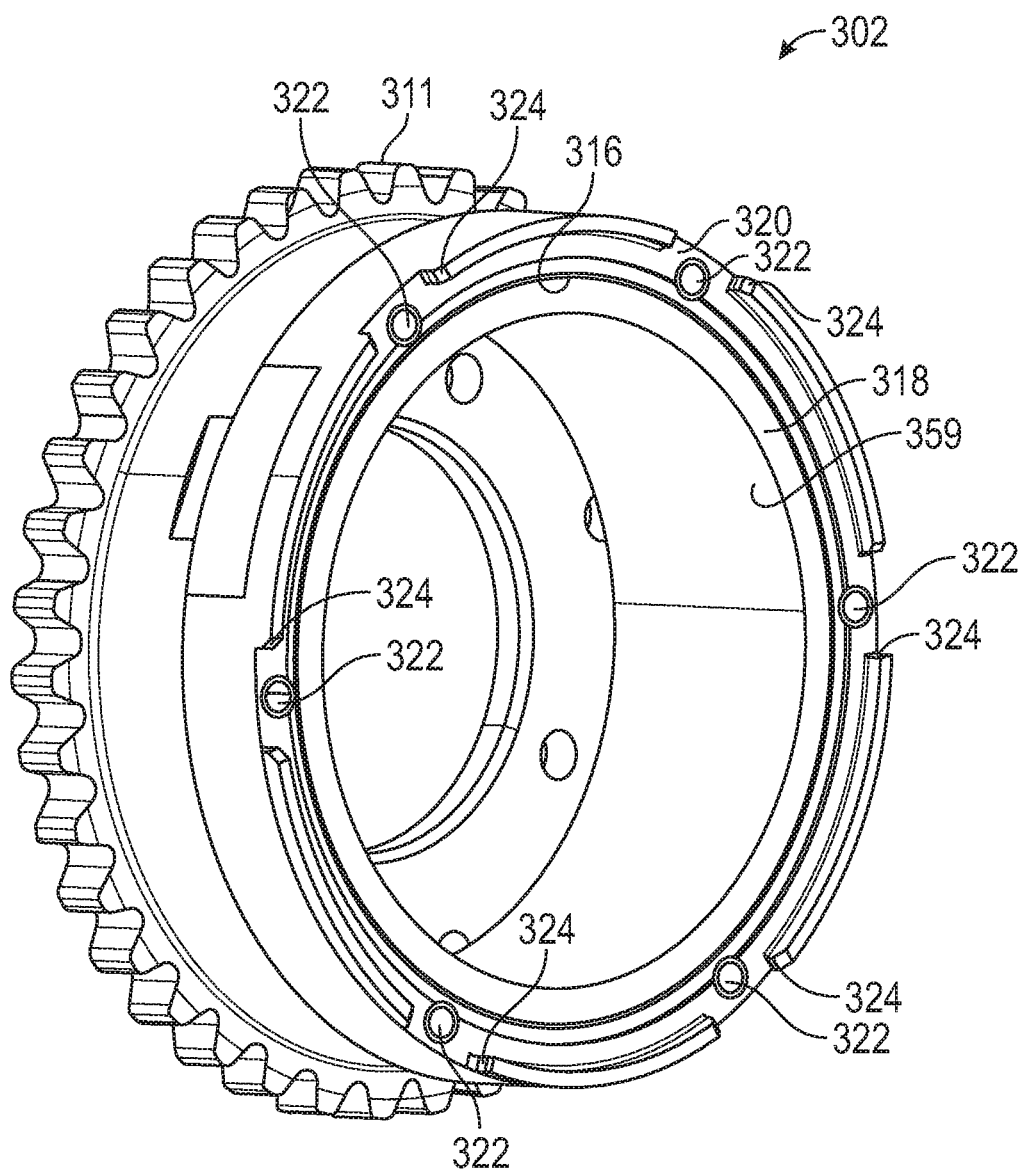
FIG. 40 is a back, top, left isometric view of a sprocket hub of the cam phasing system of FIG. 34.
Figure 41:
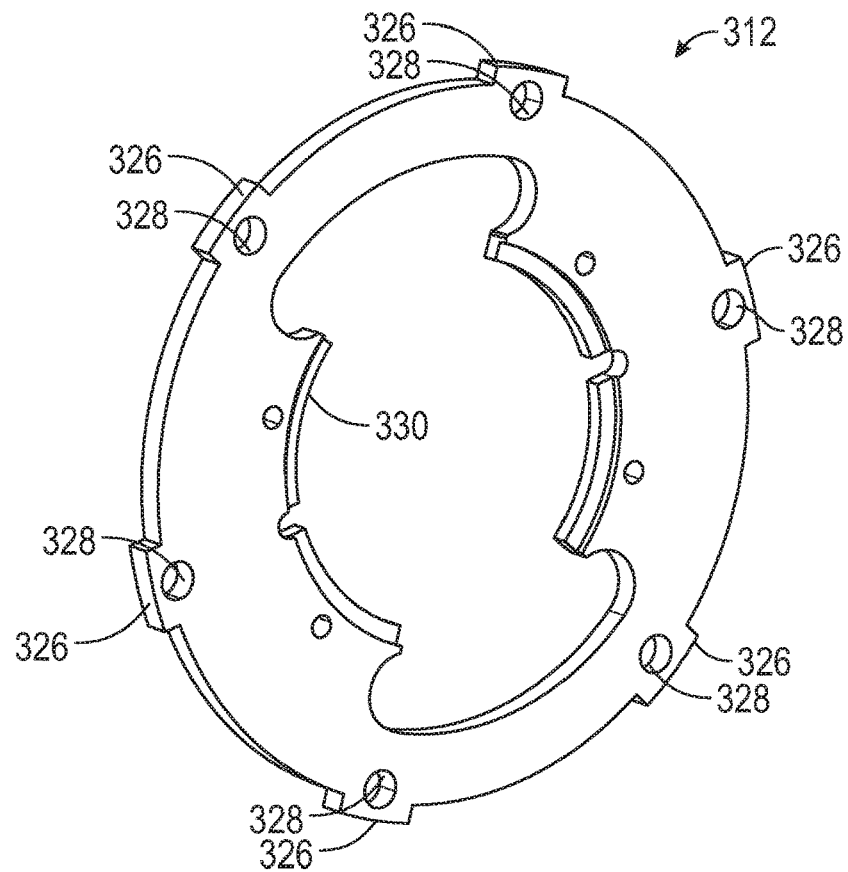
FIG. 41 is a back, top, left isometric view of an end cap of the cam phasing system of FIG. 34.

With specific reference to FIGS. 40 and 41, the sprocket hub 302 can include a gear 311 arranged on an outer diameter thereof, which can be coupled to a crank shaft (not shown) of an internal combustion engine (not shown), for example, via a belt, chain, or gear train assembly. The sprocket hub 302 can include an inner surface 316, a sprocket sleeve 318, and a front surface 320. The sprocket sleeve 318 may define a generally annular shape and is configured to be received within the sprocket hub 302. When assembled, as shown in FIG. 40, the sprocket sleeve 318 may be dimensioned to be received by and engage the inner surface 316 of the sprocket hub 302. Separating the sprocket hub 302 and the sprocket sleeve 318 into discrete components may improve durability and manufacturability of the sprocket hub 302. In particular, the sprocket sleeve 318 can define a simpler geometry and, therefore, can be manufactured to better tolerances with more robust material properties (e.g., from a harder material, which is better suited for engagement with the locking assemblies 310).

The front surface 320 of the sprocket hub 302 can include a plurality of apertures 322 configured to receive a fastening element for attaching the end cap 312 to the sprocket hub 302 for rotation therewith. Additionally, the front surface 320 of the sprocket hub 302 may define a plurality of circumferential slots 324 that are recessed axially and configured to receive radial protrusions 326, which protrude from an outer periphery of the end cap 312. In any case, the end cap 312 may be coupled to the sprocket hub 302, such that the end cap 312 rotates with the sprocket hub 302. The end cap 312 may include a plurality of cover apertures 328 and a central aperture 330. Each of the plurality of cover apertures 328 may be arranged to align with a corresponding aperture 322 on the front surface 320 of the sprocket hub 302. The central aperture 330 may be dimensioned axially receive at least a portion of the planetary actuator 104 therein.

Figure 42:
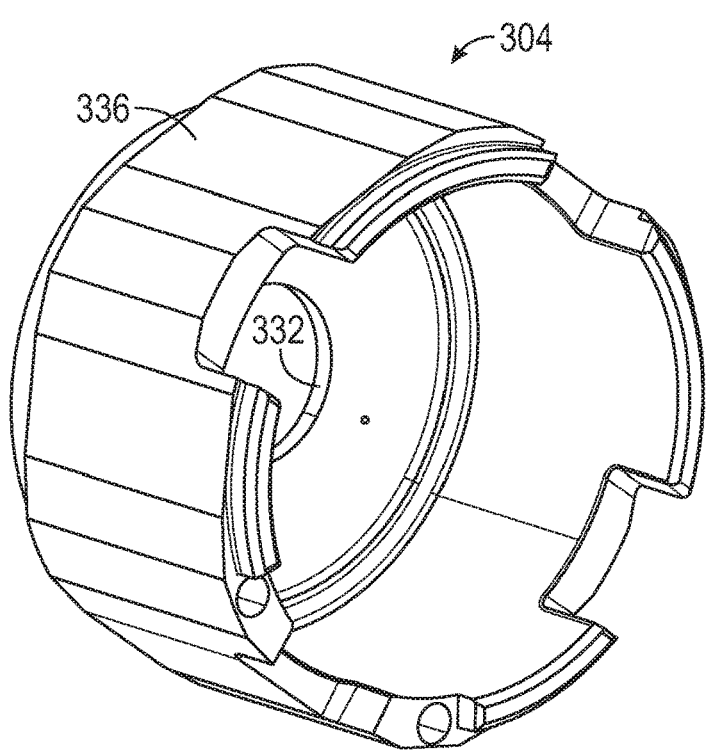
FIG. 42 is a back, top, left isometric view of a cradle rotor of the cam phasing system of FIG. 34.

With reference to FIG. 42, the cradle rotor 304 may be configured to be attached to the cam shaft (not shown) of the internal combustion engine via one or more cam coupling apertures 332, which is configured to receive a bolt 334 therein for coupling to the cam shaft. In general, an outer surface 336 of the cradle rotor 304 may be in engagement with the locking assemblies 310. It should be appreciated that alternative configurations for the relative coupling of the sprocket hub 302, the cradle rotor 304, the cam shaft, and the crank shaft are possible.

Figure 43:
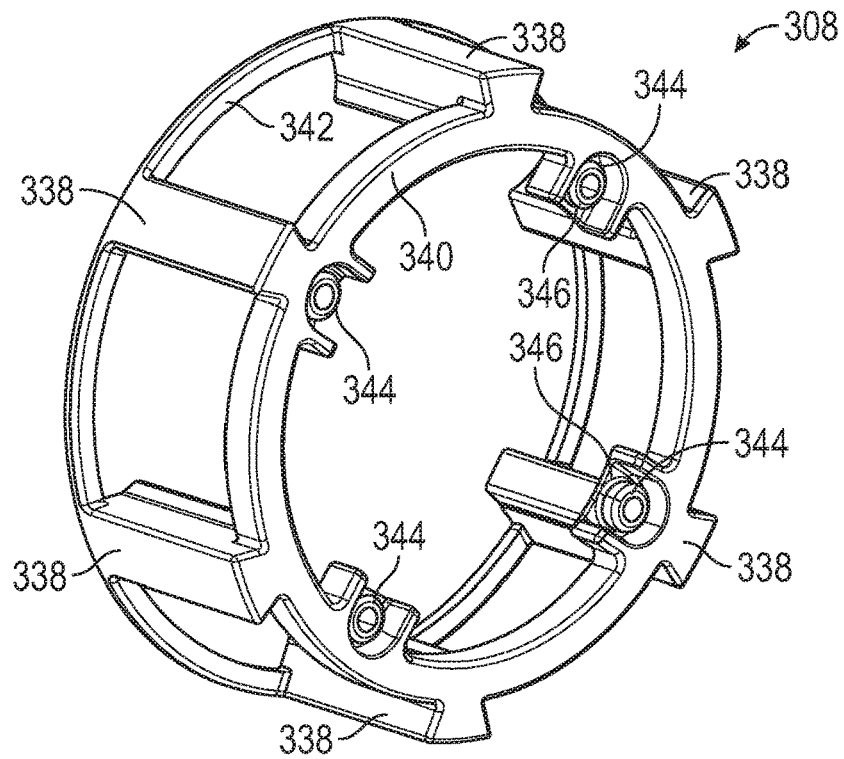
FIG. 43 is a back, top, left isometric view of a bearing cage of the cam phasing system of FIG. 34.
Figure 44:
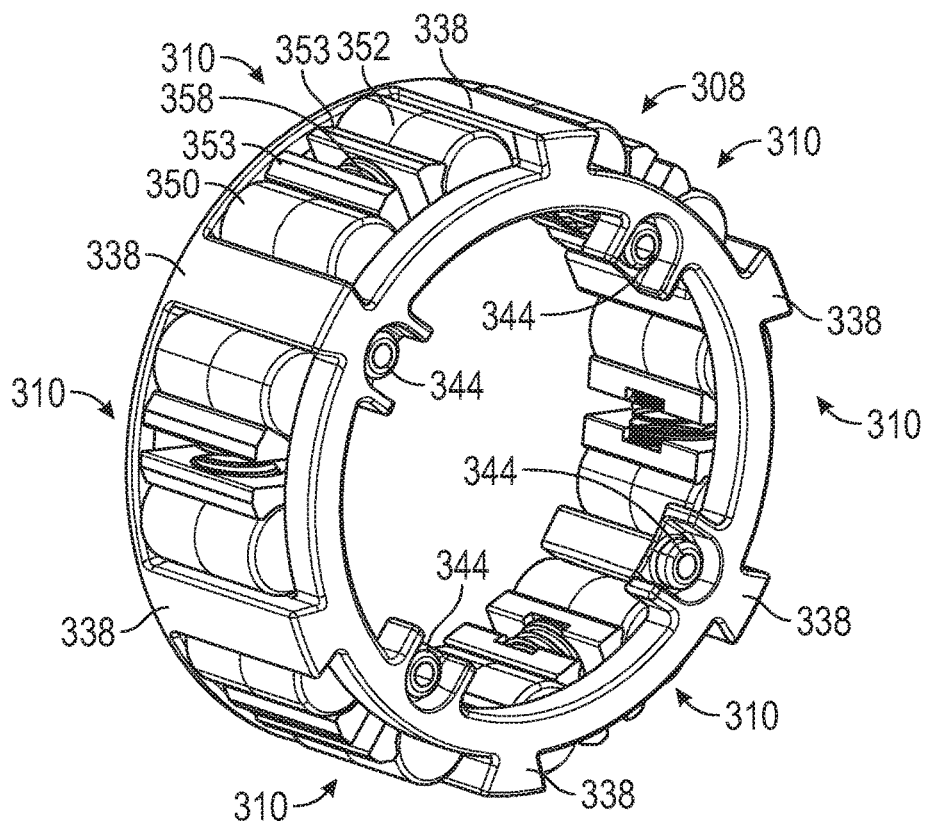
FIG. 44 is a back, top, left isometric view of the bearing cage of FIG. 43 with locking assembles installed therein.
Figure 45:
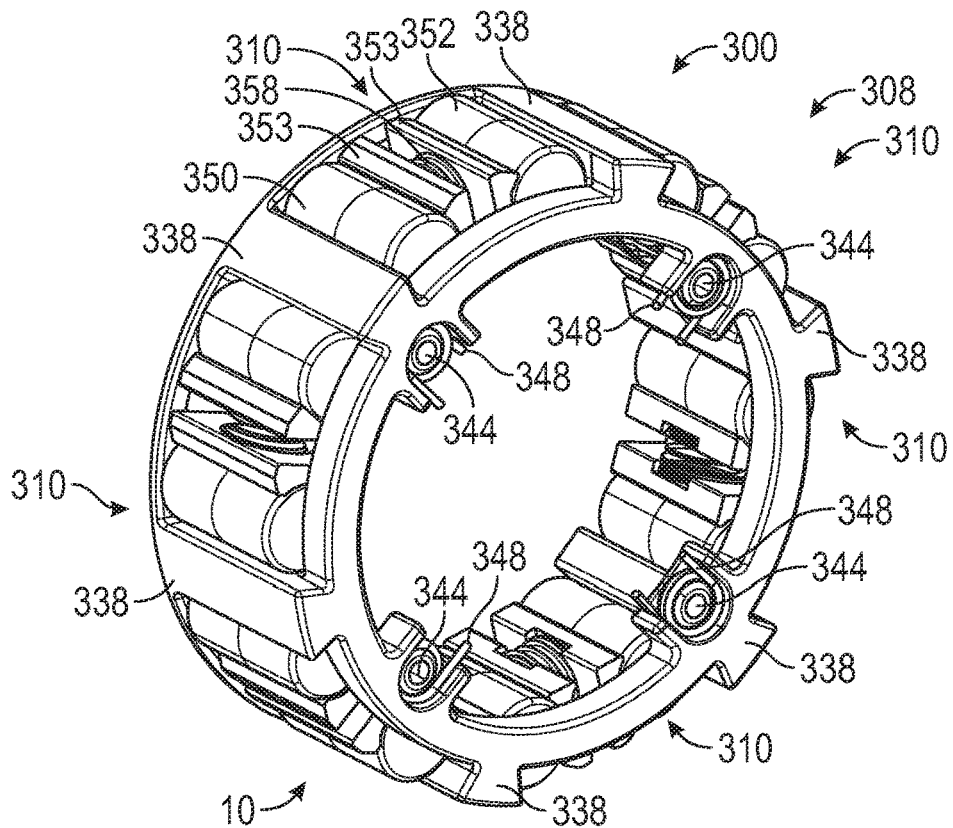
FIG. 45 is a back, top, left isometric view of the bearing cage of FIG. 44 with compliance springs installed to the bearing cage.
Figure 46:
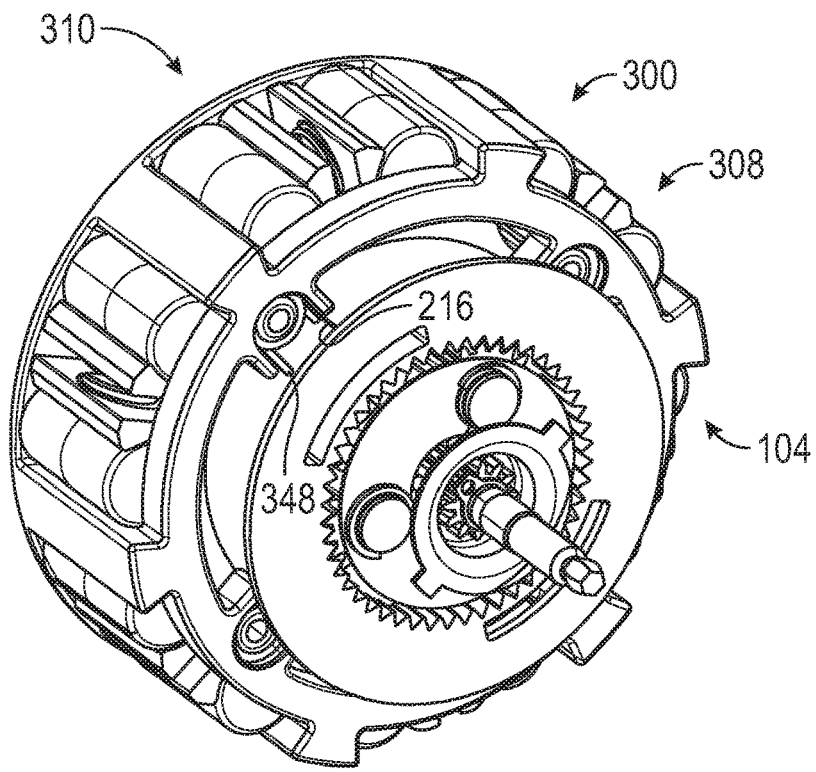
FIG. 46 is a back, top, left isometric view of the bearing cage of FIG. 45 with the planetary actuator 104 installed within the bearing cage.
Figure 47:
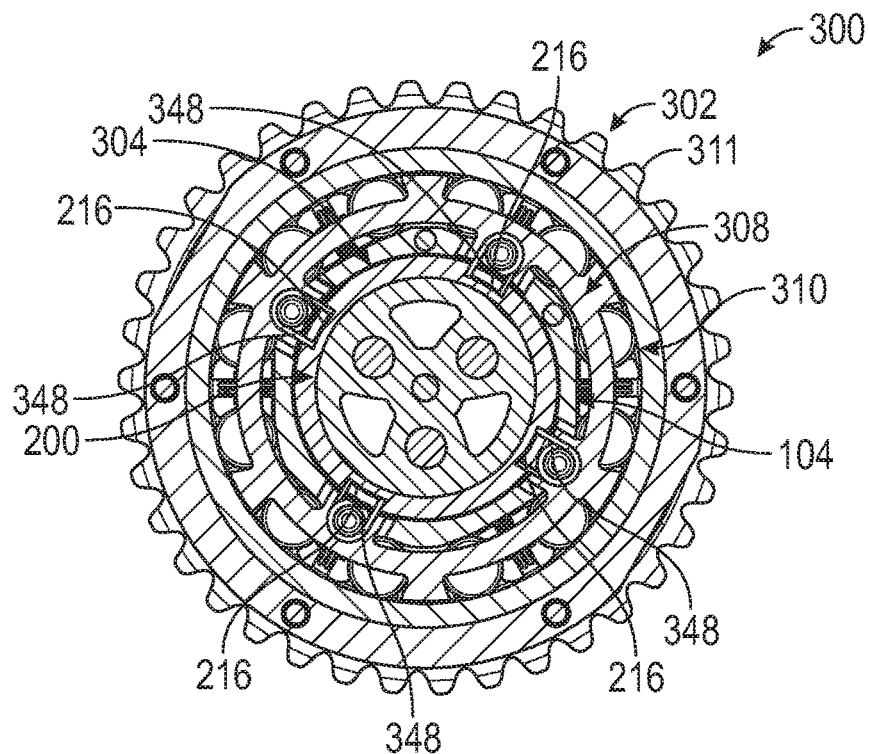
FIG. 47 is a cross-sectional view of the cam phasing system of FIG. 35 taken along line 47-47.
Figure 48:
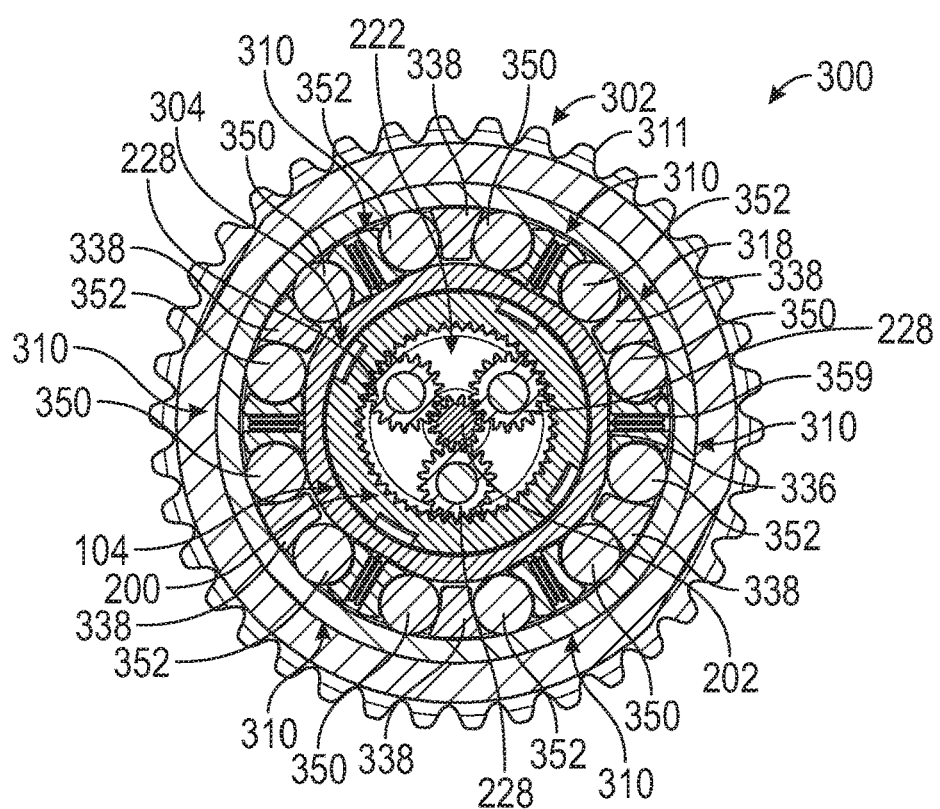
FIG. 48 is a cross-sectional view of the cam phasing system of FIG. 35 taken along line 48-48.
Figure 49:
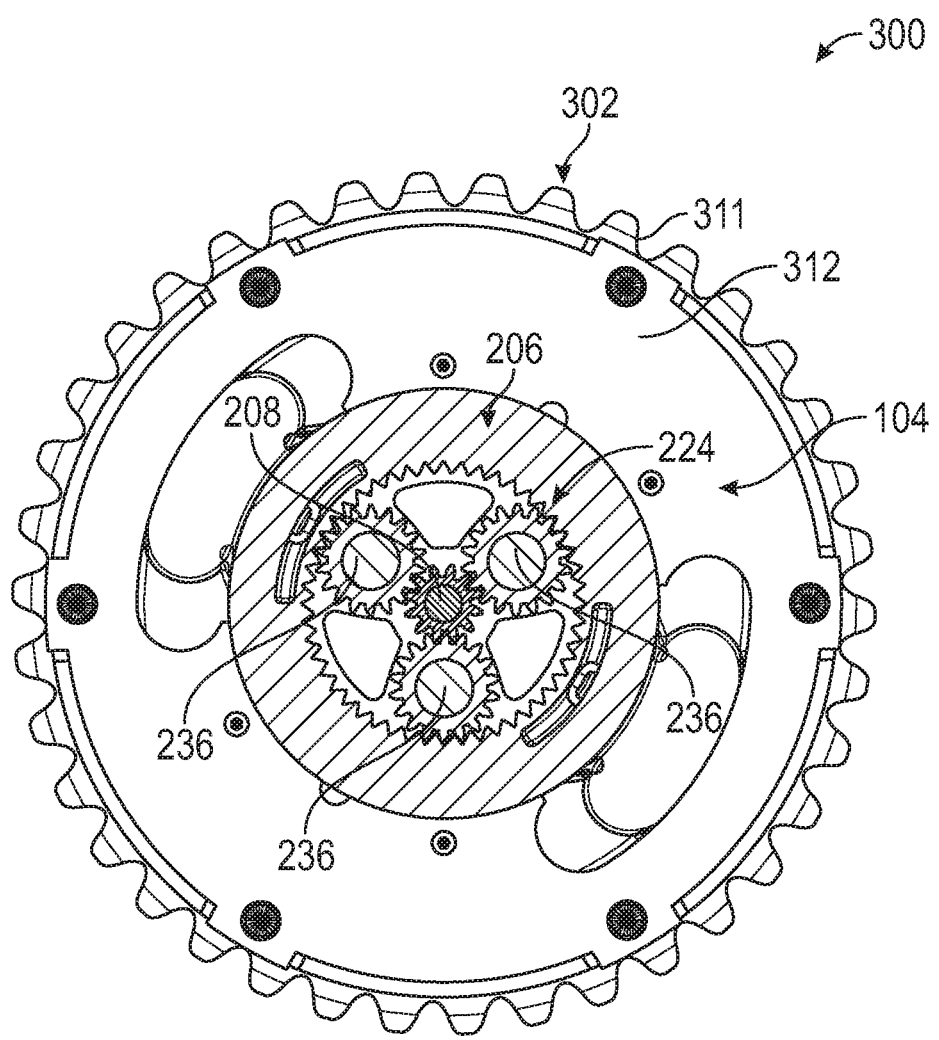
FIG. 49 is a cross-sectional view of the cam phasing system of FIG. 35 taken along line 49-49.

As illustrated in FIGS. 43-45, the bearing cage 308 may include a plurality of arms 338 that extend axially between a first cage ring 340 and a second cage ring 342. One of the plurality of locking assemblies 310 may be arranged circumferentially between each circumferentially adjacent pair of the arms 338. The bearing cage 308 may include a plurality of protrusions 344 extending axially away from a first surface 346 thereof. The number of protrusions 344 may correspond with a number of compliance springs 348 coupled between the bearing cage 308 and the first ring gear 200 of the planetary actuator 104. In the illustrated non-limiting example, the bearing cage 308 may include four protrusions 344. In other non-limiting examples, the bearing cage 308 may include more or less than four protrusions 344.

Each of the protrusions 344 may define a generally cylindrical shape and may be received within and extend through a corresponding one of the compliance springs 348. In some non-limiting examples, the compliance springs 348 may be pre-biased such that the opposing ends thereof extend away from one another in the free state. For example, opposing ends of the compliance springs 348 may extend away from one another to form a general V-shape in the free state.

Each locking assembly 310 can include a first locking feature 350, a second locking feature 352, and corresponding locking feature supports 353 in engagement with a corresponding one of the first and second locking features 350 and 352. The first locking feature 350 and the second locking feature 352 can be forced away from each other by one or more biasing members 358. The biasing members 358 can be arranged between and in engagement with corresponding pairs of the locking feature supports 353 thereby forcing the first and second locking features 350 and 352 away from each other. Each illustrated locking assembly 310 can include one biasing member 358 in the form of a spring. In other embodiments, the locking assemblies 310 each may include more than one biasing members 358, and/or the biasing members 358 may be in the form of any viable mechanical linkage capable of forcing the first locking feature 350 and the second locking feature 352 away from each other.

In the illustrated non-limiting example, the first and second locking features 350 and 352 can be in the form of round roller bearings. It should be appreciated that the first and second locking features 350 and 352 may define any shape that enables selective locking and unlocking between the sprocket hub 302 and the bearing cage 308. It should also be appreciated that alternative mechanisms are possible for the first and second locking features 350 and 352 other than a bearing. For example, the first and second locking features 350 and 352 may be in the form of wedged features.

With reference to FIGS. 46-49, when the planetary actuator 104 is installed within the bearing cage 308, the ends of each compliance spring 348 extend radially inwardly and engage a corresponding one of the plurality of recessed slots 216 formed in the first ring gear 200. With the compliance springs 348 installed, the recessed slots 216 of the first ring gear 200 may define a circumferential width to ensure that the ends of the compliance springs 348 are biased toward one another, relative to the free state thereof. Thus, the pre-bias of the compliance springs 348 may ensure that a force that results from relative rotation between the first ring gear 200 and the bearing cage 308 is maintained on the bearing cage 308 until there the bearing cage 308 is rotationally aligned with the first ring gear 200 (i.e., not rotated relative thereto).

In the illustrated non-limiting example, the plurality of locking assemblies 310 may be arranged radially between an inner surface 359 of the sprocket sleeve 314 and the outer surface 336 of the cradle rotor 304.

Figure 50:
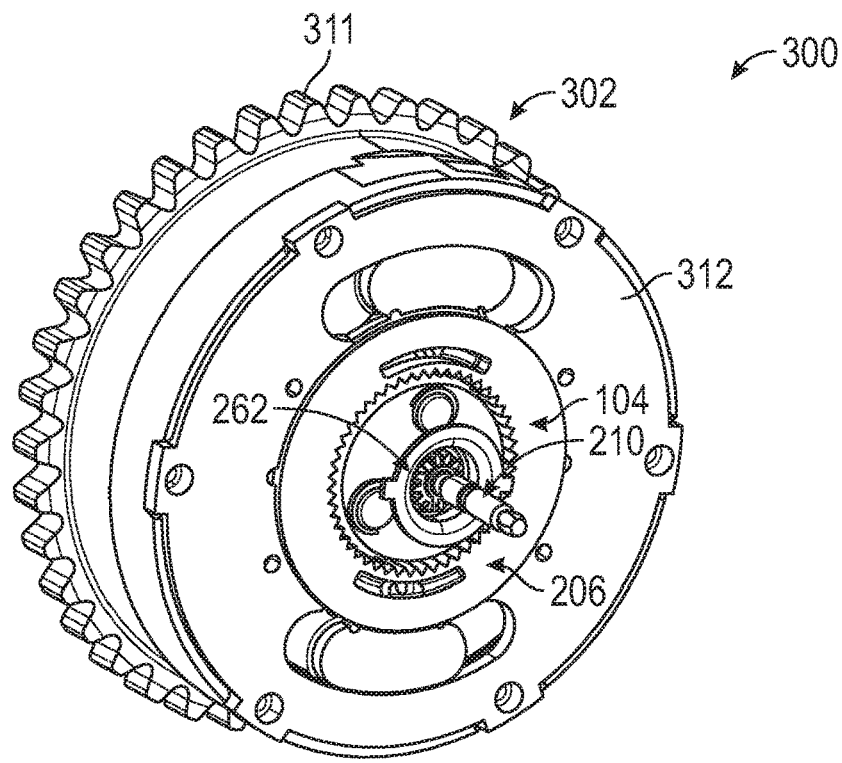
FIG. 50 is a back, top, left isometric view of the cam phasing system of FIG. 34 without a rotary actuator.
Figure 51:
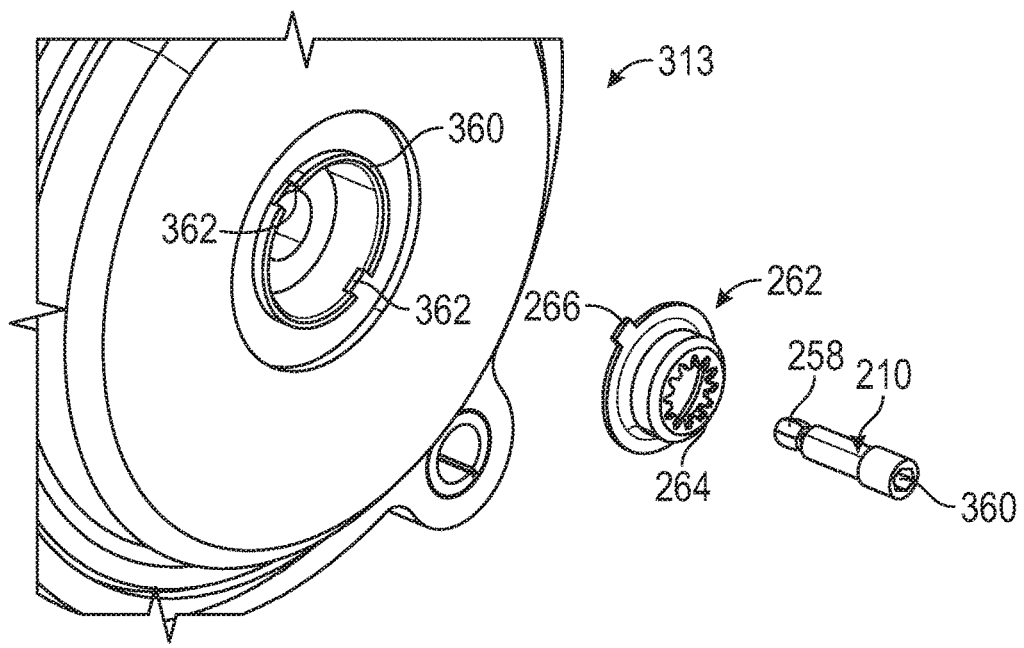
FIG. 51 is a partially-exploded, front, top, right isometric view of an input shaft, an anti-rotation ring, and a rotary actuator of the cam phasing system of FIG. 34.
Figure 52:
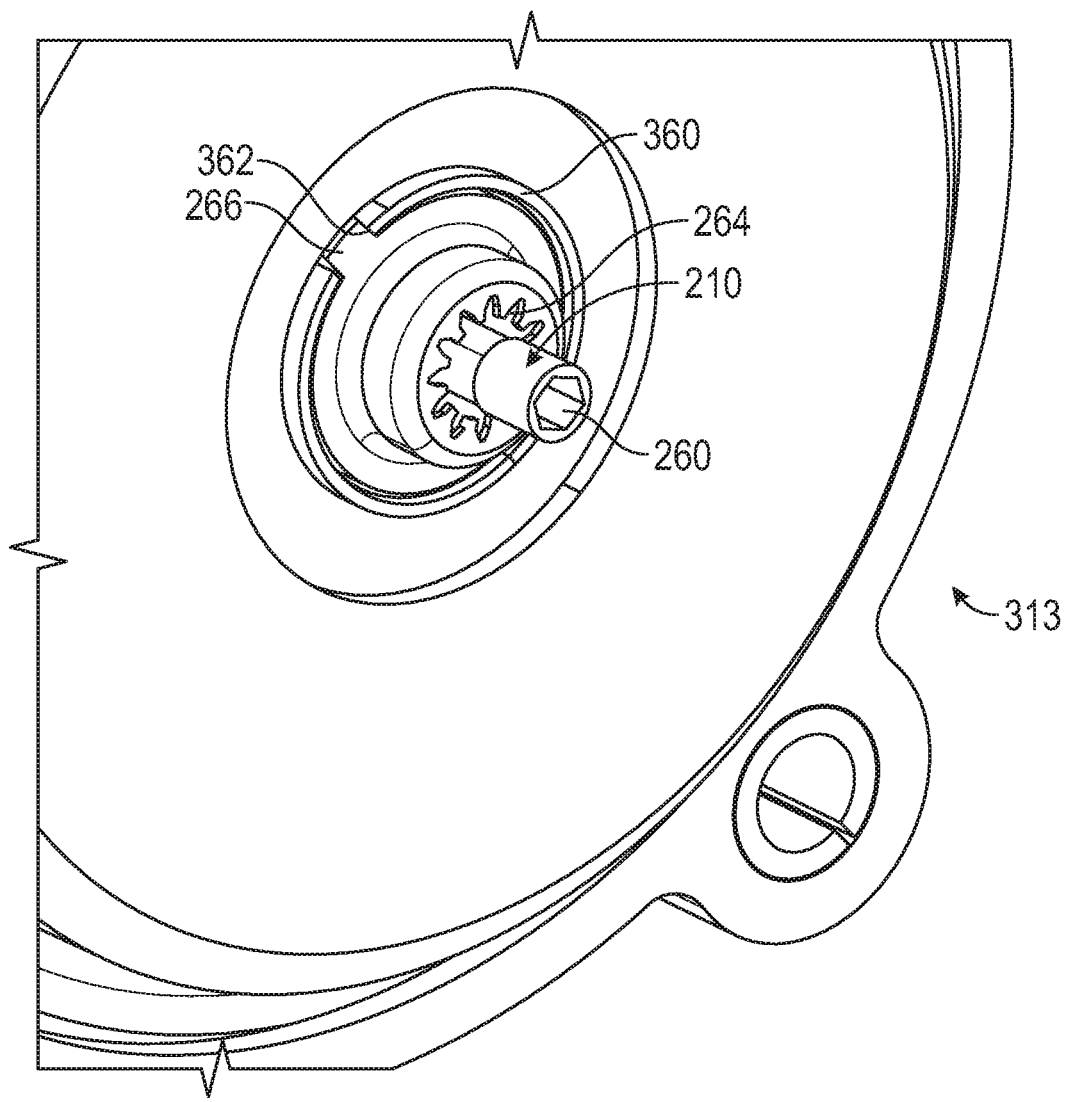
FIG. 52 is a partial front, top, right isometric view of the input shaft and the anti-rotation ring of FIG. 51 installed onto the rotary actuator.

FIGS. 50-52 illustrate a coupling between the planetary actuator 104 and the rotary actuator 313. In the illustrated non-limiting example, the input tip 258 of the input shaft 210 may be coupled to the rotary actuator 313, such that the rotary output provided by the rotary actuator 313 is rotationally transferred to the input shaft 210. The rotary actuator 313 may include a coupling ring 360 that includes axially recessed slots 362 that are configured to receive the tabs 266 of the anti-rotation ring 262 therein. In this way, for example, the second sun gear 208 may be rotationally fixed to the rotary actuator 313 and prevented from rotating. The coupling aperture 260 of the input shaft 210 may protrude axially from the rotary actuator 313 and be rotationally coupled to the tip 232 of the shaft 230. Thus, the rotary actuator 313 may be rotationally coupled to the first sun gear 202 and control the rotation thereof.

In general, the second ring gear 206 may be configured to be rotationally coupled to the sprocket hub 302, such that the second ring gear 206 rotates with the sprocket hub 302. In the illustrated non-limiting example, the second ring gear 206 may be fixed to the end cap 312, which is rotationally coupled to the sprocket hub 302 for rotation therewith.

In operation, as described herein, the rotary actuator 313 may be configured to apply the rotary displacement/torque to the first sun gear 202 to achieve a known rotary displacement of the first ring gear 200, which corresponds with a known desired rotational displacement of the bearing cage 308. The rotary actuator 313 can be controlled and powered by the engine control module (ECM) of the internal combustion engine.

During operation, as described above, the sprocket hub 302 can be coupled to the crank shaft of the internal combustion engine. The cam shaft of the internal combustion engine can be fastened to the cradle rotor 304. Thus, the cam shaft and the crank shaft can be coupled to rotate together, with the cam shaft rotating half as fast as the crank shaft, via the mechanical cam phasing system 300. The cam shaft may be configured to actuate one or more intake valves and/or one or more exhaust valves during engine operation. During engine operation, the mechanical cam phasing system 300 may be used to alter the rotational relationship of the cam shaft relative to the crank shaft, which, in turn, alters when the intake and/or exhaust valves open and close (variable valve timing). Altering the rotational relationship between the cam shaft and the crank shaft can be used to reduce engine emissions and/or increase engine efficiency at a given operation condition.

When the engine is operating and no rotational adjustment of the cam shaft is desired, the mechanical cam phasing system 300 can lock the rotational relationship between the sprocket hub 302 and the cradle rotor 304, thereby locking the rotational relationship between the cam shaft and the crank shaft. In this locked state (see, e.g., FIGS. 47 and 48), the rotary actuator 313 does not supply a rotary output to the input shaft 210 of the planetary actuator 104, and the first ring gear 200 and the second ring gear 206 rotate in unison with the sprocket hub 302. Therefore, the bearing cage 308 is not rotated relative to the sprocket hub 302 and the first locking feature 350 and the second locking feature 352 of each locking assembly 310 may be fully extended away from each other, via the biasing member 358. With the first and second locking features 350 and 352 fully extended away from one another, the first and second locking features 350 and 352 may be in engagement with at least one of the inner surface 359 of the sprocket sleeve 314 and the outer surface 336 of the cradle rotor 304, which wedges the first and second locking features 350 and 352 therebetween the cradle rotor 304 and the sprocket hub 302. This wedging can lock, or restrict movement of, the cradle rotor 304 relative to the sprocket hub 302 (i.e., the rotary position of the cradle rotor 304 is locked with respect to the sprocket hub 302). Therefore, the rotational relationship between the cam shaft and the crank shaft is unaltered, when the mechanical cam phasing system 300 is in the locked state.

If it is desired to advance or retard the intake and/or exhaust valve timing relative to the current operating conditions, the rotary actuator 313 can be instructed by the ECM to provide a rotary displacement/torque to the input shaft 210 of the planetary actuator 104. As described herein, the direction and magnitude of the rotation of the input shaft 210 may be correlated to a rotation of the first ring gear 200 relative to the second ring gear 206. Since the second ring gear 206 is rotationally coupled to the sprocket hub 302, the first ring gear 200 may be rotated relative to the sprocket hub 302. The desired magnitude and direction of the relative rotation applied to the fist ring gear 202 may be rotationally transferred to the bearing cage 308 by the compliance springs 348. For example, upon rotation of the first ring gear 200, the slots 216 engage and circumferentially bias one of the ends of the compliance springs 348 (depending on the direction of the relative rotation). This circumferential biasing of the compliance springs 348 results in the compliance springs 348 applying a corresponding force onto the protrusions 344 of the bearing cage 308. The force applied to the bearing cage 308 will be maintained thereon until the cradle rotor 304 reaches the desired rotational position relative to the sprocket hub 302, which determined by the rotary input displacement/force provided by the rotary actuator 313. In other words, a force is maintained on the bearing cage 308 until the cradle rotor 304 rotationally aligns with the bearing cage 308 and the mechanical cam phasing system 300 returns to the locked state.

The rotary force applied by the compliance springs 348 to the bearing cage 308 may circumferentially displace the arms 338 of the bearing cage 308 engage either one of the first locking features 350 or the second locking features 352 out of the locked, or wedged, position and the other one of the first locking features 350 or the second locking features 352 remain in a locked position. For example, the bearing cage 308 may be rotated clockwise (from the perspective of FIGS. 47 and 48) a desired rotational amount from the locked state. This rotation of the bearing cage 308 can engage the first locking features 350 and rotationally displace them clockwise into an unlocked position, where the first locking features 350 are displaced out of engagement with the inner surface 359 of the sprocket sleeve 314 and the outer surface 336 of the cradle rotor 304. Meanwhile, the second locking features 352 may not be rotationally displaced and can remain in a locked position.

The unlocking of the first locking features 350 can enable the cradle rotor 304 to rotate in the same rotational direction in which the bearing cage 308 was rotated. Simultaneously, the locked position of the second locking features 352 can prevent rotation of the cradle rotor 304 in a direction opposite to the direction the bearing cage 308 was rotated. Thus, in the non-limiting example where the bearing cage 308 is biased clockwise 308, the unlocked position of the first locking features 350 can enable the cradle rotor 304 to rotate clockwise, while the locked position of the second locking features 352 can prevent the cradle rotor 304 from rotating counterclockwise. This can enable the mechanical cam phasing system 300 to harvest energy from cam torque pulses that occur in the same direction as the desired relative rotational input provided by the first ring gear 200 on the bearing cage 308.

For example, in the non-limiting example where the first ring gear 200 rotationally biases the bearing cage 308 clockwise, as cam torque pulses are applied to the cradle rotor 304 in the clockwise direction, the cradle rotor 304 and the second locking features 352 can rotationally displace in a clockwise direction. Once the clockwise cam torque pulse diminishes, the cradle rotor 304 can be in a new rotary position relative to the sprocket hub 302, where the second locking features 352 again lock the cradle rotor 304 until the next cam torque pulse in the clockwise direction is applied to the cradle rotor 304. This process can continue until, eventually, the cradle rotor 304 will rotationally displace enough such that the first locking features 350 can return to the locked position. When this occurs, the first and second locking features 350 and 352 can both be in the locked position and the mechanical cam phasing system 300 can return to a locked state. The bearing cage 308 can then maintain its rotational position (until it is commanded again to alter the rotational relationship of the cam shaft relative to the crank shaft) to ensure that the first locking features 350 and the second locking features 352 remain locked, thereby locking the angular position of the cradle rotor 304 relative to the sprocket hub 302. It should be appreciated that for a counterclockwise rotation of the bearing cage 308, the reverse of the above described process would occur.

As described above, in response to a given rotary input displacement/force applied to the bearing cage 308 through the planetary actuator 104, the cradle rotor 304 rotationally follows the bearing cage 308 and eventually reaches a predefined final rotary position of the bearing cage 308 independent of the magnitude of the cam torque pulses. That is, the compliance springs 348 will maintain the input displacement/force on the bearing cage 308 provided to by the rotary actuator 313 through the planetary actuator 104 until the compliance springs 348 no longer bias the bearing cage 308 and the cradle rotor 304 rotationally follows the bearing cage 308 to the desired rotary position relative to the sprocket hub 302.

The rotation of the cradle rotor 304 with respect to the sprocket hub 302 that occurs during this phasing process can vary the rotational relationship between the cam shaft and the sprocket hub 302, which simultaneously alters the rotational relationship between the cam shaft and the crank shaft. As described above, the amount of rotation achieved by the bearing cage 308 for a given rotary input displacement/torque provided by the rotary actuator 313 can be known based on the gearing between the first sun gear 202 and the first ring gear 200 and the resultant gear ratio defined therebetween. Furthermore, the design of the mechanical cam phasing system 300 can enable the cradle rotor 304 to only be allowed to rotate in the same direction as the bearing cage 308. Thus, during engine operation the mechanical cam phasing system 300 can alter the rotational relationship between the cam shaft and the crank shaft independent of engine speed, and the direction and magnitude of the cam torque pulses. Also, the mechanical cam phasing system 300 does not need to be continually cycled to reach a desired rotational position (i.e., a desired rotational offset between the cam shaft and the crank shaft), as the cradle rotor 304 is constrained to follow the bearing cage 308 to the desired position.

In general, the design and implementation of the planetary actuator 104 only require an input signal (i.e., the input torque/displacement provided from to the input shaft 210, and thereby to the first sun gear 202 from the rotary actuator 313) to rotate when relative rotation is desired, rather than requiring the rotary actuator 313 to be constantly rotating at the same speed as the cam shaft and the sprocket hub 302. During steady-state operation, when no relative rotation is desired, the rotary actuator 313, and thereby the input shaft 210, may be rotationally fixed (e.g., stationary). During a change in phase (i.e., relative rotation), the rotary actuator 313, and thereby the input shaft 210, is not required to rotate at the same speed the cam shaft and the sprocket hub 302. For example, the output provided to the input shaft 210, and thereby the first sun gear 202, by the rotary actuator 313 may only be required to rotate at the rate of change of the relative angle desired. In this way, for example, the rotation (i.e., speed/displacement) of the input shaft 210 in during phasing may be proportional to a magnitude of the relative rotation desired between the cradle rotor 304 and the sprocket hub 302. As such, a power and speed required by the rotary actuator 313 to rotate the input shaft 210 and achieve the desired relative rotation may be independent of engine speed. That is, the power and speed output by the rotary actuator 313 may not change as a result of a change in engine speed/cam shaft speed. In addition, in the non-limiting examples, where a gear reduction exists between the input shaft 210 and the second ring gear 206, the gear reduction may reduce an amount of torque required to be output by the electric actuator 313 to achieve the desired relative rotation.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A cam phasing system for varying a rotational relationship between a crank shaft and a cam shaft, the cam phasing system comprising:
    a sprocket hub;
    a cradle rotor; and
    a planetary actuator including:
        a first sun gear;
        a first set of planet gears meshed to and arranged circumferentially around the first sun gear;
        a first ring gear meshed with the first set of planet gears, the first ring gear rotationally coupled to the cradle rotor;
        a second sun gear;
        a second set of planet gears meshed to and arranged circumferentially around the second sun gear;
        a second ring gear meshed with the second set of planet gears, the second ring gear rotationally coupled to the sprocket hub; and
        an input shaft rotationally coupled to the first sun gear such that a relative rotation of the input shaft rotates the cradle rotor relative to the sprocket hub.

2. The cam phasing system of claim 1, wherein the first set of planet gears and the second set of planet gears are coupled to a carrier plate.

3. The cam phasing system of claim 2, wherein the first set of planet gears, the second set of planet gears, the first sun gear, and the second sun gear are axially fixed relative to the carrier plate.

4. The cam phasing system of claim 1, wherein the input shaft is further rotationally coupled to a rotary actuator.

5. The cam phasing system of claim 4, wherein the second sun gear is rotationally coupled to the rotary actuator.

6. The cam phasing system of claim 1, wherein a gear ratio between the input shaft and the first ring gear defines a magnitude of relative rotation between the sprocket hub and the cradle rotor.

7. The cam phasing system of claim 1, wherein the first ring gear is further rotationally coupled to a bearing cage via one or more compliance springs.

8. The cam phasing system of claim 7, wherein one or more locking assemblies are arranged between the sprocket hub and the cradle rotor.

9. The cam phasing system of claim 8, wherein the relative rotation of the input shaft rotates the first ring gear and the bearing cage relative to the sprocket hub.

10. A cam phasing system for varying a rotational relationship between a crank shaft and a cam shaft, the cam phasing system comprising:
    a sprocket hub;
    a cradle rotor; and
    a planetary actuator including:
        a first sun gear;
        a first set of planet gears meshed to and arranged circumferentially around the first sun gear;
        a first ring gear meshed with the first set of planet gears, the first ring gear rotationally coupled to the cradle rotor;
        a second sun gear;
        a second set of planet gears meshed to and arranged circumferentially around the second sun gear;
        a second ring gear meshed with the second set of planet gears, the second ring gear rotationally coupled to the sprocket hub;
        an input shaft rotationally coupled to the first sun gear, the input shaft configured to selectively switch between (i) a steady-state mode in which relative rotation between the first ring gear and the second ring gear is inhibited, and (ii) a phasing mode in which a relative rotation of the input shaft rotates the first ring gear relative to the second ring gear,
    wherein the cradle rotor is rotationally coupled to the sprocket hub in the steady-state mode.

11. The cam phasing system of claim 10, wherein the first set of planet gears and the second set of planet gears are coupled to a carrier plate.

12. The cam phasing system of claim 11, wherein the first set of planet gears, the second set of planet gears, the first sun gear, and the second sun gear are axially fixed relative to the carrier plate.

13. The cam phasing system of claim 10, wherein the input shaft is further rotationally coupled to a rotary actuator.

14. The cam phasing system of claim 13, wherein the second sun gear is rotationally coupled to the rotary actuator.

15. The cam phasing system of claim 10, wherein a gear ratio between the input shaft and the first ring gear defines a magnitude of relative rotation between the sprocket hub and the cradle rotor.

16. The cam phasing system of claim 10, wherein the first ring gear is further rotationally coupled to a bearing cage via one or more compliance springs.

17. The cam phasing system of claim 16, wherein one or more locking assemblies are arranged between the sprocket hub and the cradle rotor.

18. The cam phasing system of claim 17, wherein the relative rotation of the input shaft rotates the first ring gear and the bearing cage relative to the sprocket hub.

19. The cam phasing system of claim 10, wherein a rotational speed of the input shaft in the phasing mode is less than a rotational speed of the second ring gear.

20. The cam phasing system of claim 19, wherein a magnitude of relative rotation of the input shaft in the phasing mode is proportional to a magnitude of relative rotation between the first ring gear and the second ring gear.

21. The cam phasing system of claim 10, wherein a gear reduction from the input shaft to the second ring gear reduces a torque required to achieve the relative rotation between the first ring gear and the second ring gear.

* * * * *